(12) United States Patent
So et al.

(10) Patent No.: US 10,922,379 B2
(45) Date of Patent: *Feb. 16, 2021

(54) METHOD FOR PROCESSING ELECTRONIC DATA

(71) Applicant: City University of Hong Kong, Kowloon (HK)

(72) Inventors: Hing Cheung So, Kowloon (HK); Wen-Jun Zeng, Kowloon (HK); Jiayi Chen, Shenzhen (CN); Abdelhak M. Zoubir, Darmstadt (DE)

(73) Assignee: City University of Hong Kong, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,136

(22) Filed: Sep. 10, 2018

(65) Prior Publication Data

US 2020/0081936 A1    Mar. 12, 2020

(51) Int. Cl.
*G06F 17/16*     (2006.01)
*G06K 9/46*      (2006.01)
*G06K 9/62*      (2006.01)
*G06F 17/18*     (2006.01)

(52) U.S. Cl.
CPC ............. *G06F 17/16* (2013.01); *G06F 17/18* (2013.01); *G06K 9/46* (2013.01); *G06K 9/6267* (2013.01)

(58) Field of Classification Search
CPC .. G06F 17/04–148; G06F 17/16; G06F 17/17; G06F 17/18
See application file for complete search history.

(56) References Cited

U.S. PATENT DOCUMENTS

2016/0055124 A1*  2/2016  Galvin ............... G06F 17/16
                                                          707/741

OTHER PUBLICATIONS

Z. Wang, et al., Rank-One Matrix Pursuit for Matrix Completion, Proceedings of the 31st International Conference on Machine Learning, JMLR: W&CP vol. 32, 2014 (Year: 2014).*
J. Yan et al., Sparse 2-D Canonical Correlation Analysis via Low Rank Matrix Approximation for Feature Extraction, IEEE Signal Processing Letters, vol. 19, No. 1, 2012 (Year: 2012).*
A.B. Xu et al., Low-rank approximation pursuit for matrix completion, Mechanical Systems and Signal Processing 95, 2017 (Year: 2017).*
N.K. Krivulin, Rank-One Approximation of Positive Matrices Based on Methods of Tropical Mathematics, Vestnik St.Petersb. Univ. Math, vol. 51, No. 2, Jun. 2018 (Year: 2018).*
E. J. Candès, et al, "Robust Principal Component Analysis?" Journal of the ACM, vol. 58, No. 3, Article 11, May 2011.

(Continued)

*Primary Examiner* — Andrew Caldwell
*Assistant Examiner* — Emily E Larocque
(74) *Attorney, Agent, or Firm* — Renner Kenner Greive Bobak Taylor & Weber

(57) ABSTRACT

A method for processing electronic data includes the steps of transforming the electronic data to a matrix representation including a plurality of matrices; decomposing the matrix representation into a series of matrix approximations; and processing, with an approximation process, the plurality of matrices thereby obtaining a low-rank approximation of the plurality of matrices.

20 Claims, 10 Drawing Sheets

(56) References Cited

OTHER PUBLICATIONS

P. N. Belhumeur, J. P. Hespanha, and D. J. Kriengman, "Eigenfaces vs. Fisherfaces: Recognition using class specific linear projection," IEEE Transactions on Pattern Analysis and Machine Intelligence, vol. 19, No. 7, pp. 711-720, Jul. 1997.

J. Yang, D. Zhang, A. Frangi, and J.-y. Yang "Two-dimensional PCA: A new approach to appearance-based face representation and recognition," IEEE Transactions on Pattern Analysis and Machine Intelligence, vol. 26, No. 1, pp. 131-13 7, Jan. 2004.

J. Y e, "Generalized low rank approximations of matrices," Machine Learning, vol. 61 , No. 1-3, pp. 167-191 , 2005.

\* cited by examiner

METHOD FOR PROCESSING ELECTRONIC DATA

TECHNICAL FIELD

The present invention relates to a method for processing electronic data, and particularly, although not exclusively, to a method for obtaining low-rank representation of signals or data near a low-dimensional subspace and data reconstruction.

BACKGROUND

Electronic data stored in electronic storage medium may be analysed using different processor, including digital processor, which is designed for processing digital source data in the digital domain.

For example, digital images may be processed by a digital signal processor which may efficiently analyse and process the digital image, and the processor may further process the image by further modifying the image data using certain algorithm or digital filter. Alternatively, other types of digital data, such as data related to dimensionality reduction, computer vision, machine learning, pattern classification and data analytics, may also be analysed or processed using digital methods.

SUMMARY OF THE INVENTION

In accordance with a first aspect of the present invention, there is provided a method for processing electronic data, comprising the steps of: transforming the electronic data to a matrix representation including a plurality of matrices; decomposing the matrix representation into a series of matrix approximations; and processing, with an approximation process, the plurality of matrices thereby obtaining a low-rank approximation of the plurality of matrices.

In an embodiment of the first aspect, the approximation process includes a greedy pursuit approximation process.

In an embodiment of the first aspect, the approximation process includes a linear regression process.

In an embodiment of the first aspect, the approximation process includes determining a best rank-one approximation of a plurality of residual matrices in each of a plurality of iteration steps in the approximation process.

In an embodiment of the first aspect, the approximation process further includes subtracting a plurality of rank-one basis matrices from the plurality of residual matrices.

In an embodiment of the first aspect, the method further comprises the step of representing a solution associated with the matrix representation and the K residual matrices as $(u_i, v_i, s^i)$ and $\{R_k^i\}_{k=1}^{K}$ at the ith iteration step.

In an embodiment of the first aspect, in the ith iteration step, the rank-one approximation of $\{R_k^{i-1}\}_{k=1}^{K}$ is determined.

In an embodiment of the first aspect, the method further comprises the step of determining the coefficients $\{s_{k,l}\}$ of the matrix representation $(u_i, v_i, s^i)$ at the ith iteration.

In an embodiment of the first aspect, the coefficients $\{s_{k,l}\}$ are determined by a least squares method.

In an embodiment of the first aspect, the coefficients $\{s_{k,l}\}$ are determined after obtaining $\{u_l\}_{l=1}^{i}$ and $\{v_l\}_{l=1}^{i}$ at the ith iteration.

In an embodiment of the first aspect, the approximation process includes an orthogonal greedy pursuit approximation process.

In an embodiment of the first aspect, the approximation process further includes a rank-one fitting process for obtaining the low-rank approximation of the plurality of matrices.

In an embodiment of the first aspect, the low-rank approximation of the plurality of matrices are determined to be a principal singular value of each of the plurality of matrices having a maximum spectral norm.

In an embodiment of the first aspect, the approximation process includes an economic greedy pursuit approximation process.

In an embodiment of the first aspect, the step of decomposing the matrix representation into a series of matrix approximations includes a non-orthogonal decomposition of the plurality of matrices.

In an embodiment of the first aspect, the non-orthogonal decomposition includes a joint diagonal decomposition.

In an embodiment of the first aspect, the electronic data include at least one of digital image data, textual data, audio data, and financial data.

In an embodiment of the first aspect, the electronic data are digitally compressed.

In an embodiment of the first aspect, the method further comprises the step of constructing a data representation of the electronic data being processed based on the low-rank approximation of the plurality of matrices.

In an embodiment of the first aspect, processing of electronic data includes image reconstruction of digital image with noise and/or defect.

In an embodiment of the first aspect, processing of electronic data includes a feature extraction process for classification of the electronic data.

In accordance with a second aspect of the present invention, there is provided a method for processing digital image data, comprising the steps of: transforming the digital image data to a matrix representation including a plurality of matrices; decomposing the matrix representation into a series of matrix approximations; processing, with an approximation process, the plurality of matrices thereby obtaining a low-rank approximation of the plurality of matrices; and constructing at least one digital image based on the low-rank approximation of the plurality of matrices.

In an embodiment of the second aspect, the digital image data represent at least one source image with noise and/or defect.

In an embodiment of the second aspect, the approximation process includes a greedy pursuit approximation process.

In an embodiment of the second aspect, the step of decomposing the matrix representation into a series of matrix approximations includes a non-orthogonal decomposition of the plurality of matrices.

In an embodiment of the second aspect, the non-orthogonal decomposition includes a joint diagonal decomposition.

In an embodiment of the second aspect, the method further comprises the step of processing the digital image data using a feature extraction process for classification of the digital image data.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that, various kind of data, such as electronic data, may be approximated by matrices whose ranks are much smaller than their column and row lengths. The low-rank matrix approximation may extract the low-dimensional subspaces or principal components of the matrices constructed from these signals.

In some example embodiments, low-rank approximation may be applied in computer vision, pattern classification, machine learning, and data analytics. In these examples, signals or data such as textual, visual, audio and financial data lie near some low-dimensional subspace.

For example, principal component analysis (PCA), which may be realized by the truncated singular value decomposition (SVD), may be applied in processing the data. However, it is found that PCA and SVD may only deal with a single matrix and fail to capture the low-rank components when the observations contain outliers.

The inventors noted that to deal with multiple matrices without vectorization, a two-dimensional PCA (2DPCA) may be applied to directly transform the original matrices into ones with lower column number. However, the 2DPCA merely reduces the column size while the row size remains unchanged because a single-sided transform is adopted, implying limited compression capability.

The generalized low rank approximations of matrices (GLRAM) applies a double-sided transform to reduce both row and column sizes, which considerably improves compression capability. Under the same compression ratio, the GLRAM achieves smaller reconstruction error than the 2DPCA.

Therefore, the inventors have devised a joint low-rank approximation of multiple matrices (LRAMM). As in the 2DPCA and GLRAM, the LRAMM also does not convert matrices into vectors and thus avoids processing the matrix with much larger size. Different from the GLRAM, the LRAMM achieves a non-orthogonal but joint diagonal factorization of multiple matrices, which leads to a more compact representation and a higher compression ratio.

In one example embodiment, there is provided a greedy pursuit (GP) method for joint low-rank approximation of multiple matrices via decomposing the problem into a series of rank-one approximations. At each iteration, the best rank-one approximation of the residual matrices is determined, and then the rank-one basis matrices are subtracted from the residual. An alternating optimization method is designed for the rank-one fitting. In addition, the GP method is further modified/optimized to an economic greedy pursuit (EGP) method and an orthogonal greedy pursuit (OGP) method, which further reduces the complexity and accelerates the convergence, respectively.

Figure 1:
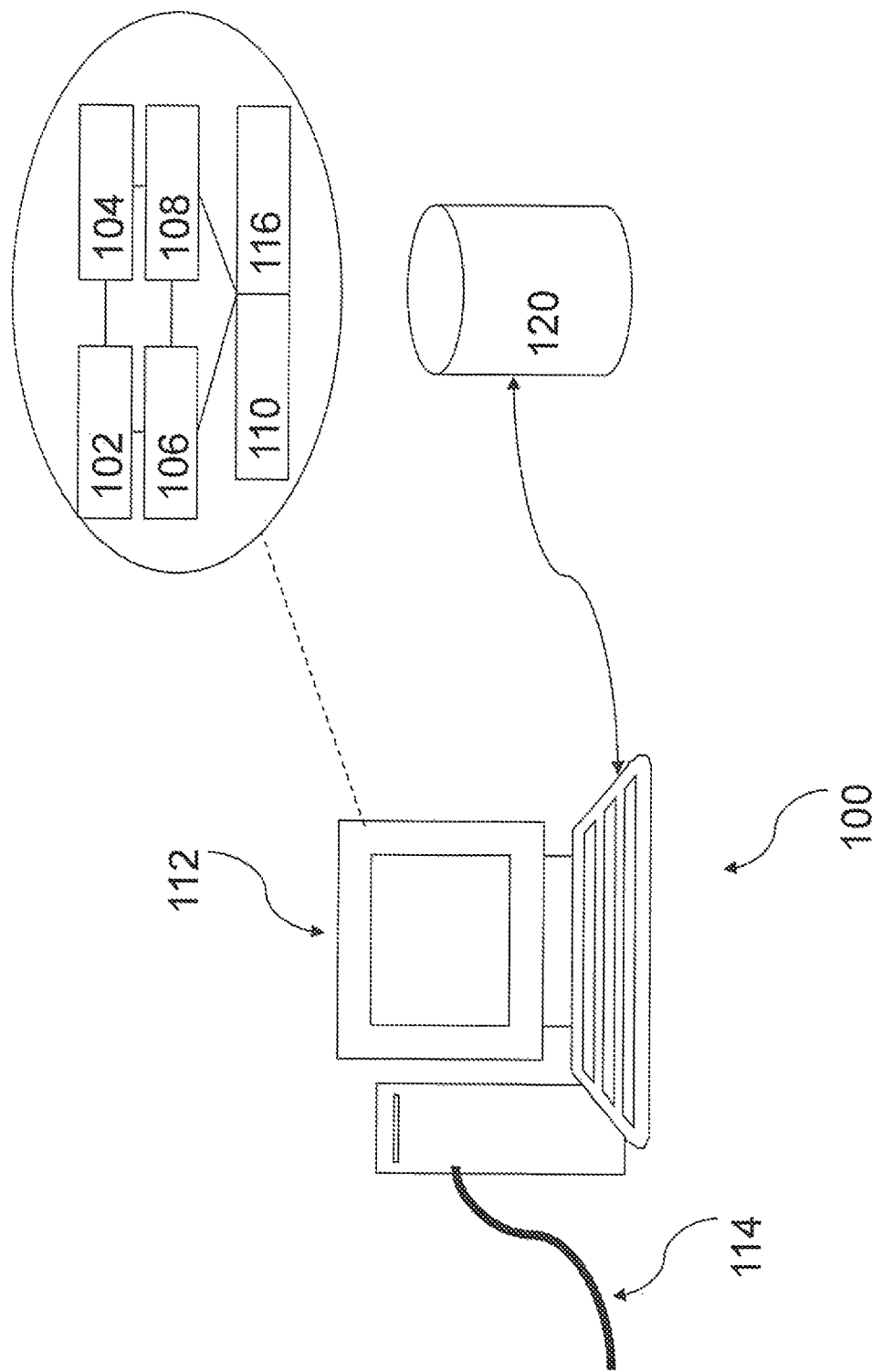
FIG. 1 is a schematic diagram of a computing server for operation as a system for processing electronic data in accordance with one embodiment of the present invention.

With reference to FIG. 1, an embodiment of the present invention is illustrated. This embodiment is arranged to provide a system for processing electronic data, such as but not limited to digital image data, textual data, audio data, and financial data. The system may perform a method for processing electronic data, comprising the steps of: transforming the electronic data to a matrix representation including a plurality of matrices; decomposing the matrix representation into a series of matrix approximations; and processing, with an approximation process, the plurality of matrices thereby obtaining a low-rank approximation of the plurality of matrices.

Preferably, in one example, the system may be used to process digital image data which may be mixed with noise and/or defects (such as missing data from a source image). The raw data of the digital image may be represented, transformed or transcoded as matrix or matrices representing the image data for further processing. The digital data may also be digitally compressed in some examples, and the data may be further compressed or decompressed by the system.

In this embodiment, the system for processing electronic data is implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

Referring to FIG. 1, there is shown a schematic diagram of a computer or a computing server 100 which in this embodiment comprises a server 100 arranged to operate, at least in part if not entirely, the system for processing electronic data with the method in accordance with one embodiment of the invention. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device which is arranged to store at least one record. The database 120 is in communication with the server 100 with an interface, which is implemented by computer software residing on the server 100. Alternatively, the database 120 may also be implemented as a stand-alone database system in communication with the server 100 via an external computing network, or other types of communication links.

In this embodiment, the system for processing electronic data may perform an approximation process including a greedy pursuit (GP) approximation process, an economic greedy pursuit (EGP) approximation process and/or an orthogonal greedy pursuit (OGP) approximation process.

Preferably, the entire process may start with formulating an initial problem according to the following steps. Given K matrices $\{A_1, \ldots, A_K\} \in \mathbb{R}^{m \times n}$, the task is to find their low-rank approximation. In one example, the following low-rank approximation of $A_k$ may be used:

$$A_k \approx U S_k V^T, \quad k=1, \ldots, K \quad (1)$$

where $U=[u_1, \ldots, u_m] \in \mathbb{R}^{m \times r}$, $V=[v_1, \ldots, v_n] \in \mathbb{R}^{n \times r}$, and $S_k = \text{diag}\{s_{k,1}, \ldots, s_{k,r}\} \in \mathbb{R}^{r \times r}$ is a diagonal matrix with r being the target rank. Note that r>min (m,n) is allowed but generally r≤mn is required. Here, U and V are the same for all k but $S_k$ can be different with each other. The columns of U and V span the r-dimensional subspaces of the column and row spaces of $\{A_k\}_{k=1}^{K}$.

Therefore, the low-rank approximation also achieves the task of subspace learning. According to the least squares criterion, the LRAMM method aims to solve the following minimization problem:

$$\min_{U,V,\{S_k\}_{k=1}^K} \sum_{k=1}^{K} \|U S_k V^T - A_k\|_F^2. \quad (2)$$

If $(U,V,S_k)$ is an optimal solution of (2), then $(\alpha_1 U, \alpha_2 V, \alpha_3 S_k)$ with $\{\alpha_1, \alpha_2, \alpha_3\} \in \mathbb{R}$ satisfying $\alpha_1 \alpha_2 \alpha_3 = 1$ is also a solution. To avoid this scaling indeterminacy, the norms of $\{u_i, v_i\}_{i=1}^r$ may be constrained to be unit, and (2) may be rewritten as $$\min f(u_i, v_i, \{s^i\}_{i=1}^r) := \sum_{k=1}^{K} \left\| \sum_{i=1}^{r} s_{k,i} u_i v_i^T - A_k \right\|_F^2 \quad (3)$$

$$\text{s.t.} \ \|u_i\| = \|v_i\| = 1, i=1, \ldots, r$$

where $$s^i = [s_{1,i}, \ldots, s_{K,i}]^T \in \mathbb{R}^K. \quad (4)$$

That is, the LRAMM problem is to find U, V and $\{S_k\}_{k=1}^K$ given $\{A_k\}_{k=1}^K$ according to (3).

Preferably, data compression may be one example application of the LRAMM method: mnK real numbers are required to store the K original matrices but the memory complexity is reduced to (m+n+K)r via low-rank approximation which is only characterized by U, V and the diagonal elements of $\{S_k\}_{k=1}^K$, yielding a compression ratio of mnK/((m+n+K)r). This implies that (1) can still achieve data compression when r>min(m,n) if r≪mn.

Indeed, the compression ratio and reconstruction error decrease as r increases. Hence r>min(m,n) may be employed to attain a satisfying reconstruction error. It is worth pointing out that if the number of matrices is K=1, by the Eckart-Young theorem, the solution of (3) is the truncated SVD of $A_1$. That is, $\{s_{1,i}\}_{i=1}^r$ are the r largest singular values of $A_1$, and $\{u_i\}_{i=1}^r$ and $\{v_i\}_{i=1}^r$ are the corresponding left and right singular vectors, respectively. However, when the number of matrices is K>1, the truncated SVD cannot be applied to solving (3).

In some examples, PCA may be applied for low-rank representation. However, the PCA cannot directly handle multiple matrices whereas each matrix needs to be converted into a vector $a_k = \text{vec}(A_k) \in \mathbb{R}^{mn}$. Then, the K vectors $\{a_k\}_{k=1}^K$ form the columns of the following data matrix:

$$X = [a_1, \ldots, a_K] \in \mathbb{R}^{mn \times K} \quad (5)$$

whose rank satisfies rank(X)≤min(mn,K). The PCA aims to find a low-rank matrix $\hat{X}$ to best approximate the original data matrix X:

$$\min_{\text{rank}(\hat{X})=r} \|\hat{X} - X\|_F^2 \quad (6)$$

where the target rank r is usually taken as r≪min(mn,K) to achieve data compression or dimensionality reduction. Again, by the Eckart-Young theorem, the solution of (6) is given by the truncated SVD of X, which is expressed as:

$$\hat{X} = \sum_{l=1}^{r} \sigma_l(X) t_l y_l^T \quad (7)$$

where $\sigma_l(X)$ is the lth singular value of X while $t_l \in \mathbb{R}^{mn}$ and $y_l \in \mathbb{R}^K$ are the corresponding left and right singular vectors.

In data compression, it may be required to store the so-called principal components, that is, the largest r singular values and the corresponding singular vectors $\{\sigma_l(X), t_l, y_l\}_{l=1}^r$, resulting in the PCA compression ratio of mnK/((mn+K+1)r). Nevertheless, there are two drawbacks of the PCA method applied to processing multiple matrices.

First, it needs to handle a matrix of a much larger size due to transforming the original matrix into a long vector. Indeed, the truncated SVD of X has a high complexity of $\mathcal{O}(\max(m^2 n^2, K^2)r)$. For high-dimensional data with mn>K, this complexity becomes $\mathcal{O}(m^2 n^2 r)$, which quadratically increases with mn. Second, the vectorization breaks the 2D structure and the inherent relation between rows and columns.

The 2DPCA computes a linear transformation $W \in \mathbb{R}^{n \times r}$ with r<n, such that each matrix is projected to $C_k = A_k W \in \mathbb{R}^{m \times r}$. The W maximizes the variance in the transformed space $$\max_{W^T W = I_r} W^T \left( \sum_{k=1}^{K} (A_k - \bar{A})^T (A_k - \bar{A}) \right) W \quad (8)$$

where $\bar{A} = (\Sigma_{k=1}^K A_k)/K$ is the mean of the matrices. The columns of the optimal W are the r eigenvectors of $\Sigma_{k=1}^K$ $(A_k - \overline{A})^T (A_k - \overline{A})$ corresponding to the largest r eigenvalues. The matrices can be reconstructed by $\hat{A}_k = C_k W^T$. The 2DPCA needs to store $\{C_k\}_{k=1}^K$ and W, implying a compression ratio of (mnK)/((mK+n)r). As the 2DPCA only applies a single-sided transform to the matrices, its compression capability is thus limited. The computational complexity of the 2DPCA is $\mathcal{O}(mn^2K)$.

The GLRAM method may solve the following constrained problem:

$$\min_{U^T U = V^T V = I_r, \{S_k\}} \sum_{k=1}^K \|U S_k V^T - A_k\|_F^2 \qquad (9)$$

where the orthonormal constraints make it different from the LRAMM formulation (3) where U and V are not necessarily orthogonal. In addition, the matrices $\{S_k\}_{k=1}^K$ given by the GLRAM are not diagonal whereas those of the LRAM are diagonal. Hence, the compression ratio of the GLRAM is mnK/((m+n+Kr)r), which is lower for the same r. Exploiting the orthogonality of U and V, the GLRAM is reduced to $$\max_{U^T U = V^T V = I_r} \sum_{k=1}^K \|U^T A_k V\|_F^2 \qquad (10)$$

where a two-sided transform is performed.

Preferably, the processing method in accordance with an embodiment of the present invention involves processing, the plurality of matrices thereby obtaining a low-rank approximation of the plurality of matrices with an approximation process, and the approximation process may include a greedy pursuit approximation process as discussed earlier.

The analysis and processing of the matrices may begin after transformation of these source electronic data is completed, the matrix representation of the electronic data may then be processed with the approximation process after a decomposition process. Preferably, the step of decomposing the matrix representation into a series of matrix approximations includes a non-orthogonal decomposition of the plurality of matrices, wherein the non-orthogonal decomposition includes a joint diagonal decomposition.

In this example, the Greedy Pursuit (GP) approximation process includes decomposing the r-term approximation into a series of rank-one approximations. At each iteration, the greedy algorithms perform rank-one approximation of the residual matrices obtained from the previous iteration. Then, the rank-one matrices are subtracted from the residuals and never revisited.

The approximation process may also include a linear regression process, which may include the step of determining a best rank-one approximation of a plurality of residual matrices in each of a plurality of iteration steps in the approximation process.

The GP approximation process for LRAMM may be performed as described in Algorithm 1. It works in an iterative fashion. Preferably, the method comprises a step of representing a solution associated with the matrix representation and the K residual matrices as $(u_i, v_i, s^i)$ and $\{R_k^i\}_{k=1}^K$ at the ith iteration step. In the ith iteration step, the GP finds the rank-one approximation of $\{R_k^{i-1}\}_{k=1}^K$, which may be expressed as $$\min f(u, v, s) := \sum_{k=1}^K \|s_k u v^T - R_k^{i-1}\|_F^2 \qquad (11)$$

$$\text{s.t. } \|u\| = \|v\| = 1$$

where $s = [s_1, \ldots, s_K]^T$ collects the K variables $\{s_k\}_{k=1}^K$ to be optimized. The updating equations are:

$$(u_i, v_i, s^i) = \arg\min_{\|u\| = \|v\| = 1, s} \sum_{k=1}^K \|s_k u v^T - R_k^{i-1}\|_F^2 \qquad (12)$$

and $$R_k^i = R_k^{i-1} - s_{k,i} u_i v_i^T, k = 1, \ldots, K. \qquad (13)$$

When the target rank r is given or can be estimated, the process terminates when i>r. If the rank information is unavailable, the normalized reconstruction error (NRE), which is defined as the energy of the K residual matrices, is employed as the stopping criterion:

$$NRE = \frac{\sum_{k=1}^K \|R_k^i\|_F^2}{\sum_{k=1}^K \|R_k^0\|_F^2} \leq \delta \qquad (14)$$

where $\delta > 0$ is the tolerance. The remaining problem is to efficiently solve the rank-one approximation of multiple matrices, which is presented as follows.

---

Algorithm 1 GP for LRAMM

---

Input: Matrices $\{A_k\}_{k=1}^K$ and target rank r.
  Initialization: Set residual $R_k^0 = A_k$ for k = 1, ..., K.
  for i = 1, 2, ..., r do
    Solve rank-one approximation $$(u_i, v_i, s^i) = \underset{\|u\|=\|v\|=1,s}{\operatorname{argmin}} \sum_{k=1}^K \|s_k u v^T - R_k^{i-1}\|_F^2.$$

Update residual
      $R_k^i = R_k^{i-1} - s_{k,i} u_i v_i^T$, k = 1, ..., K.
  end for
Output: $U = [u_1, \ldots, u_r]$, $V = [v_1, \ldots, v_r]$, and $\{s^i\}_{i=1}^r$.

---

For the purpose of simplicity, the superscript $(\cdot)^{i-1}$ of $R_k^{i-1}$ may be omitted and (11) may be rewritten as $$\min_{\|u\|=\|v\|=1,s} \sum_{k=1}^K \|s_k u v^T - R_k\|_F^2. \qquad (15)$$

The rank-one approximation of (15) is not easy to solve since the unit-norm constraints are nonconvex and the product term of the objective function $s_k u v^T$ is also nonconvex. Therefore s may be emanated to obtain an optimization problem only with u and v. The kth term of (15) is computed as $$f_k(u, v, s_k) = \|s_k uv^T - R_k\|_F^2 \quad (16)$$
$$= s_k^2 \|uv^T\|_F^2 - 2s_k tr(vu^T R_k) + \|R_k\|_F^2$$
$$= s_k^2 - 2(u^T R_k v)s_k + \|R_k\|_F^2$$

where $\|A\|_F^2 = tr(A^T A)$ and $tr(AB) = tr(BA)$ as well as the fact $\|uv^T\|_F^2 = tr(vu^T uv^T) = \|u\|^2 \|v\|^2 = 1$ may be exploited. Apparently, $\{s_k\}_{k=1}^K$ are decoupled with each other and can be solved independently. For fixed u and v, the optimal $s_k$ minimizing $f_k$, denoted by $s_k^*$, is given by $$\frac{\partial f_k}{\partial s_k} = 2(s_k - u^T R_k v) = 0 \Rightarrow s_k^* = u^T R_k v. \quad (17)$$

Plugging (17) back into (16) yields the minimum value of the objective function $$\left\{\min_{s_k} f_k(u, v, s_k)\right\} = \|R_k\|_F^2 - (u^T R_k v)^2. \quad (18)$$

then, the following problem with s being eliminated may be obtained $$\min_{\|u\|=\|v\|=1} \left\{\sum_{k=1}^K \|R_k\|_F^2 - \sum_{k=1}^K (u^T R_k v)^2\right\} \quad (19)$$

where the reconstruction error $\Sigma_{k=1}^K \|R_k\|_F^2$ is a constant at the current iteration. It is clear that (19) amounts to $$\max_{\|u\|=\|v\|=1} \sum_{k=1}^K (u^T R_k v)^2. \quad (20)$$

For K=1, the optimal estimates of (20), u* and v*, are the left and right singular vectors associated with the largest singular value $\sigma_{max}(R_1)$, respectively, which can be efficiently computed by the power method with a low complexity of $\mathcal{O}(mn)$. The corresponding maximum of the objective function is $\sigma_{max}^2(R_1)$. Note that the largest singular value of a matrix is its spectral norm, i.e., $\sigma_{max}(R_1) = \|R_1\|_2$.

For K>1, an alternating maximization method may be used to solve (20), where the objective function is maximized over one vector while the other vector is fixed. To be more specific, at the (j+1)th (j=0, 1, ...) iteration, u and v are alternately maximized:

$$u^{j+1} = \underset{\|u\|=1}{\arg\max} \sum_{k=1}^K (u^T R_k v^j)^2 \quad (21)$$

and $$v^{j+1} = \underset{\|v\|=1}{\arg\max} \sum_{k=1}^K ((u^{j+1})^T R_k v)^2. \quad (22)$$

then (21) may be rewritten as $$\max_{\|u\|=1} u^T \left(\sum_{k=1}^K R_k v^j (R_k v^j)^T\right) u \quad (23)$$

in which an optimal solution may be the unit-norm eigenvector corresponding to the maximum eigenvalue of the positive definite matrix $\Sigma_{k=1}^K R_k v^j (R_k v^j)^T$.

Similarly, the solution of (22) is the unit-norm eigenvector associated with the maximum eigenvalue of $\Sigma_{k=1}^K R_k^T u^{j+1} (R_k^T u^{j+1})^T$. Since (20) is nonconvex, the final convergence result relies on the initial values $u^0$ and $v^0$. Appropriate selection of the initial values is thus important. Suppose that the $k_m$th ($k_m \in \{1, \ldots, K\}$) matrix $R_{k_m}$ has the maximum spectral norm. That is, $$\|R_{k_m}\|_2 = \max_{1 \leq k \leq K} \|R_k\|_2. \quad (24)$$

By using the principal singular vectors of $R_{k_m}$ as the initial values:

$$u^0 = LSV_{max}(R_{k_m}), \, v^0 = RSV_{max}(R_{k_m}) \quad (25)$$

where $LSV_{max}(R_{k_m})$ and $RSV_{max}(R_{k_m})$ stand for the left and right singular unit-norm vectors associated with the maximum singular value of $R_{k_m}$, respectively. Their updating equations are:

$$u^{j+1} = EV_{max}\left(\sum_{k=1}^K R_k v^j (R_k v^j)^T\right) \quad (26)$$

and $$v^{j+1} = EV_{max}\left(\sum_{k=1}^K R_k^T u^{j+1} (R_k^T u^{j+1})^T\right) \quad (27)$$

where $EV_{max}(\cdot)$ represents the unit-norm eigenvector associated with the maximum eigenvalue. The procedure for solving the rank-one approximation of multiple matrices of (15) is summarized in Algorithm 2.

---

Algorithm 2 Rank-One Approximation of Multiple Matrices

Input: Matrices $\{R_k\}_{k=1}^K$.
  Initialization: Determine $k_m$ by $$k_m = \underset{1 \leq k \leq K}{\arg\max} \|R_k\|_2.$$

Set $u^0 = LSV_{max}(R_{k_m})$ and $v^0 = RSV_{max}(R_{k_m})$.
  for j = 0, 1, 2, ... do
    Update u and v:

$$u^{j+1} = EV_{max}\left(\sum_{k=1}^K R_k v^j (R_k v^j)^T\right)$$

$$v^{j+1} = EV_{max}\left(\sum_{k=1}^K R_k^T u^{j+1} (R_k^T u^{j+1})^T\right)$$

Stop until convergence satisfies.
  end for
  $s_k^* = (u^{j+1})^T R_k v^{j+1}$, k = 1, ..., K.
Output: $u^* = u^{j+1}$, $v^* = v^{j+1}$, and $k^* = [s_1^k, \ldots, s_K^*]^T$.

---

Regarding the complexity of the GP approximation process, the initialization needs to compute the largest singular values of K matrices and the principal singular vectors of one matrix, whose complexity is $\mathcal{O}(mnK)$ if the power method is employed. The matrix-vector products $R_k v^j$ and $R_k^T u^{j+1}$ require a cost of $\mathcal{O}(mn)$. The computational loads for the outer products $R_k v^j (R_k v^j)^T$ and $R_k^T u^{j+1} (R_k^T u^{j+1}))^T$ are $\mathcal{O}(m^2)$ and $\mathcal{O}(n^2)$, respectively. Thus, forming the matrices in (26) and (27) requires $\mathcal{O}((mn+m^2)K)$ and $\mathcal{O}((mn+n^2)K)$ operations, respectively. Calculation of principal eigenvectors of (26) and (27) needs $\mathcal{O}(m^2)$ and $\mathcal{O}(n^2)$. In summary, the per-iteration complexity of rank-one approximation of Algorithm 2 is $\mathcal{O}((\max(m,n))^2 K)$ and the total complexity is $\mathcal{O}((\max(m,n))^2 K N_{iter})$, where $N_{iter}$ is the number of iterations required for convergence. Typically, several tens of iterations are enough to converge with high accuracy. Also, $N_{iter}$ can be viewed as a constant independent of the dimension. Then, it is clear that the complexity of the GP for LRAMM of Algorithm 1 is $\mathcal{O}((\max(m,n))^2 rK N_{iter})$. When m and n have the same order-of-magnitude, say, $\mathcal{O}(m) \sim \mathcal{O}(n)$, it follows $\mathcal{O}((\max(m,n))^2) \sim \mathcal{O}(mn)$, resulting in a total complexity of approximately $\mathcal{O}(mnrK N_{iter})$. This implies that the complexity of the GP algorithm is linear with respect to the number of elements in a matrix, mn, and the number of matrices, K. Hence, the GP algorithm is scalable to problem size.

In an alternative embodiment, the approximation process includes an economic greedy pursuit approximation process. In this embodiment, the approximation process further includes a rank-one fitting process for obtaining the low-rank approximation of the plurality of matrices, in which the low-rank approximation of the plurality of matrices are determined to be a principal singular value of each of the plurality of matrices having a maximum spectral norm.

The dominant cost of the GP method is the iterative procedure in Algorithm 2 for solving the rank-one fitting problem. To reduce the complexity, an economic version of the GP, namely, the EGP, which is listed in Algorithm 3 as shown below.

---
Algorithm 3 EGP for LRAMM
---

Input: Matrices $\{A_k\}_{k=1}^K$ and target rank r.
  Initialization: Set residual $R_k^0 = A_k$ for k = 1, ..., K.
  for i = 1, 2, ..., r do Determine $k_m = \arg\max_{1 \le k \le K} \|R_k^{i-1}\|_2$ and set $u_i = LSV_{max}(R_{k_m}^{i-1})$, $v_i = RSV_{max}(R_{k_m}^{i-1})$,
    and $s_{k,i} = u_i^T R_k^{i-1} v_i$ for k = 1, ..., K.
    Update residual
      $R_k^i = R_k^{i-1} - s_{k,i} u_i v_i^T$, k = 1, ..., K.
  end for
Output: U = [$u_1, ..., u_r$], V = [$v_1, ..., v_r$], and $\{s^i\}_{i=1}^r$.

---

Preferably, it only takes the initial values of (25), i.e., the principal singular value/vectors of the matrix having the maximum spectral norm, as an approximate solution to the rank-one fitting. In doing so, the iterative procedure is not involved and the algorithm complexity is reduced to $\mathcal{O}(mnr K)$. Note that employing the inexact solution in (25) also makes the EGP converge but its convergence rate is generally slower than that of the GP method.

In another alternative embodiment, the approximation process includes an orthogonal greedy pursuit approximation process. In this embodiment, the coefficients $\{s_{k,l}\}$ of the matrix representation $(u_i, v_i, s^i)$ is determined using a least squares method at the ith iteration step.

From Algorithm 1, it may be observed that once a rank-one solution $(u_i, v_i, s^i)$ is obtained, it is never revisited and hence remains unchanged all the time. The OGP method may be considered as a modification to the GP method. Analogous to the orthogonal matching pursuit for sparse recovery, the OGP still keeps $(u_i, v_i)$ unchanged, however the OGP process re-computes all coefficients $\{s_{k,l}\}$ by least squares, which realizes the so-called "orthogonalization" among the coefficients. To be more specific, after obtaining $\{u_l\}_{l=1}^i$ and $\{v_l\}_{l=1}^i$ at the ith iteration, $\{s_{k,l}\}$ are re-computed by $$\min_{\{s_{k,l}\}} \sum_{k=1}^K \left\| \sum_{l=1}^i s_{k,l} u_l v_l^T - A_k \right\|_F^2 \quad (28)$$

which can be decomposed into the following K independent minimization problems:

$$\min_{s_{k,1},...,s_{k,i}} \left\| \sum_{l=1}^i s_{k,l} u_l v_l^T - A_k \right\|_F^2 \quad (29)$$

for k=1, ..., K, because $\{s_{k,l}\}$ can be separately solved with respect to k. the vector is further defined as $$s_k = [s_{k,1}, ..., s_{k,i}]^T \in \mathbb{R}^i \quad (30)$$

which should be distinguished from $s^i \in \mathbb{R}^K$ in (4). Obviously, if r=1, the OGP is the same as the GP because both of them are just a rank-one approximation problem. Therefore, only case of r>2 is considered for the OGP.

To derive the solution of (28). Recalling $a_k = \text{vec}(A_k) \in \mathbb{R}^{mn}$ and defining $b_l = \text{vec}(u_l v_l) \in \mathbb{R}^{mn}$, (29) amounts to $$\min_{s_k} \left\{ \left\| \sum_{l=1}^i s_{k,l} b_l - a_k \right\|^2 = \|B_i s_k - a_k\|^2 \right\} \quad (31)$$

where $$B_i = [b_1, ..., b_i] \in \mathbb{R}^{mn \times i}. \quad (32)$$

It is worth pointing out that there is no need to construct the matrices in practice and it is only required to use the vectors for derivation. Note that the column number of $B_i$ is the iteration number i and varies during the iterative process. The solution of (31) is $$s_k = (B_i^T B_i)^{-1} B_i^T a_k. \quad (33)$$

However, $s_k$ is not processed by the direct use of (33) since it involves matrix multiplication and inversion, which is computationally expensive. Instead, a recursive calculation is exploited to reduce the complexity. It is clear that $B_i^T a_k$ can be recursively calculated as $$c_k^i \triangleq B_i^T a_k = \begin{bmatrix} B_{i-1}^T a_k \\ b_i^T a_k \end{bmatrix} = \begin{bmatrix} c_k^{i-1} \\ u_i^T A_k v_i \end{bmatrix} \quad (34)$$

where $c_k^{i-1} = B_{i-1}^T a_k \in \mathbb{R}^{i-1}$ is the result of the (i−1) th iteration, and is employed in the current iteration. At the beginning, $c_k^0 = \emptyset$ is set. Note that $b_i^T a_k$ can be computed as $$b_i^T a_k = \langle b_i, a_k \rangle = \langle u_i v_i^T, A_k \rangle \quad (35)$$
$$= tr(v_i u_i^T A_k) = u_i^T A_k v_i$$

where $\langle vec(A), vec(B)\rangle = \langle A, B \rangle$ satisfies for two arbitrary matrices A and B. When $c_k^{i-1}$ is available, the cost to obtain $c_k^i$ is computing $b_i^T a_k$, which requires $\mathcal{O}(mn)$ operations.

Next, the recursive computation of $(B_i^T B_i)^{-1}$ is considered. Obviously, $B_i^T B_i$ is the Gram matrix of the vectors $\{b_1, \ldots, b_i\}$ and it may be denoted as $G_i = B_i^T B_i \in \mathbb{R}^{i \times i}$. The $G_i$ and $G_{i-1}$ are related via $$G_i = B_i^T B_i = \begin{bmatrix} B_{i-1}^T \\ b_i^T \end{bmatrix}[B_{i-1}, b_i] \quad (36)$$

$$= \begin{bmatrix} B_{i-1}^T B_{i-1} & B_{i-1}^T b_i \\ b_i^T B_{i-1} & b_i^T b_i \end{bmatrix}$$

$$= \begin{bmatrix} G_{i-1} & g_{i-1} \\ g_{i-1}^T & 1 \end{bmatrix}$$

where $$g_{i-1} = B_{i-1}^T b_i \subset \mathbb{R}^{i-1} \quad (37)$$

and $$b_i^T b_i = \langle b_i, b_i \rangle = \langle u_i v_i^T, u_i v_i^T \rangle = tr(v_i u_i^T u_i v_i^T) = \|u_i\|^2 \|v_i\|^2 = 1 \quad (38)$$

are applied. Let $$h_{i-1} = G_{i-1}^{-1} g_{i-1}, \beta = \frac{1}{1 - g_{i-1}^T h_{i-1}} \quad (39)$$

the inverse of $G_i$ may be obtained as $$G_i^{-1} = \begin{bmatrix} G_{i-1}^{-1} + \beta h_{i-1} h_{i-1}^T & -\beta h_{i-1} \\ -\beta h_{i-1}^T & \beta \end{bmatrix} \quad (40)$$

with the use of the block matrix inversion formula. Again, the result of the (i−1) th iteration $G_{i-1}^{-1}$ is already available for the current iteration. The initial value is set as $G_0^{-1} = 0$ while $G_1^{-1} = 1$ at the first iteration. For $i \geq 2$, $G_i^{-1}$ is recursively calculated by (40). It is only necessary to compute whose $g_{i-1}$, whose pth (p=1, ..., i−1) entry is $$[g_{i-1}]_p = b_p^T b_i = \langle b_p, b_i \rangle = \langle u_p v_p^T, u_i v_i^T \rangle \quad (41)$$

$$= tr(v_p u_p^T u_i v_i^T) = (u_p^T u_i)(v_p^T v_i)$$

which only requires a complexity of $\mathcal{O}(m+n)$ rather than $\mathcal{O}(mn)$. Then, $$g_{i-1} = [(u_1^T u_i)(v_1^T v_i), \ldots, (u_{i-1}^T u_i)(v_{i-1}^T v_i)]^T. \quad (42)$$

Computing $g_{i-1}$ costs $\mathcal{O}(i(m+n))$, It is either lower than or similar to the computational load of $b_i^T a_k$ in (35), namely, $\mathcal{O}(mn)$ due to i<r and r~max(m,n) in general. Similar to (13), the residual is updated as $$R_k^i = A_k - \sum_{l=1}^{i} s_{k,l} u_l v_l^T, k = 1, \ldots, K. \quad (43)$$

In summary, the dominant computational load for re-computation of the coefficients in the OGP is calculating $\{b_i^T a_k\}_{k=1}^K$, which is $\mathcal{O}(mn K)$. The OGP for LRAMM in summarized in Algorithm 4 as follows.

---

Algorithm 4 OGP for LRAMM

Input: Matrices $\{A_k\}_{k=1}^K$ and target rank r.
Initialization: Set residual $R_k^0 = A_k$ for k =1, ..., K.
For i = 1, use Algorithm 1 to obtain $(u_1, v_1)$ and $\{R_k^1\}_{k=1}^K$.
Set $G_1^{-1} = 1$ and $c_k^1 = u_1^T A_k v_1$ for k = 1, ..., K.
for i = 2, 3, ..., r do
  Solve rank-one approximation $$(u_i, v_i) = \operatorname*{argmin}_{\|u\|=\|v\|=1, s} \sum_{k=1}^K \|s_k u v^T - R_k^{i-1}\|_F^2.$$

Compute
  $g_{i-1} = [(u_1^T u_i)(v_1^T v_i), \ldots, (u_{i-1}^T u_i)(v_{i-1}^T v_i)]^T$
  $h_{i-1} = G_{i-1}^{-1} g_{i-1}$
  $\beta = 1/(1 - g_{i-1}^T h_{i-1})$ $$G_i^{-1} = \begin{bmatrix} G_{i-1}^{-1} + \beta h_{i-1} h_{i-1}^T & -\beta h_{i-1} \\ -\beta h_{i-1}^T & \beta \end{bmatrix}$$

$$c_k^i = \begin{bmatrix} c_k^{i-1} \\ u_i^T A_k v_i \end{bmatrix}, k = 1, \ldots, K.$$

$[s_{k,1}, \ldots, s_{k,i}]^T = G_i^{-1} c_k^i$, k = 1, ..., K.
  Calculate residual $$R_k^i = A_k - \sum_{l=1}^i s_{k,l} u_l v_l^T, k = 1, \ldots, K.$$

end for
Output: U = $[u_1, \ldots, u_r]$, V = $[v_1, \ldots, v_r]$, and $\{s_{k,l}\}$ with $1 \leq k \leq K$, $1 \leq l \leq r$.

---

The inventors has compared the performances including compression ratios and computational complexities of the PCA, 2DPCA, GLRAM, GP/OGP and EGP in Table 1.

TABLE I

Compression ratio and computational complexity

| Method | Compression ratio | Complexity |
|---|---|---|
| PCA | $\dfrac{mnK}{(mn + K + 1)r}$ | $\mathcal{O}(\max(m^2 n^2, K^2)r)$ |
| 2DPCA | $\dfrac{mnK}{(mK + n)r}$ | $\mathcal{O}(mn^2 K)$ |
| GLRAM | $\dfrac{mnK}{(m + n + Kr)r}$ | $\mathcal{O}((m + n)^2 r K N_{iter})$ |
| GP/OGP | $\dfrac{mnK}{(m + n + K)r}$ | $\mathcal{O}((\max(m, n))^2 r K N_{iter})$ |
| EGP | $\dfrac{mnK}{(m + n + K)r}$ | $\mathcal{O}(mnrK)$ |

Optionally or additionally, the method for processing of electronic data, such as digital image data, may further include a feature extraction process for classification of the electronic data.

In addition to the direct application to data compression, the GP algorithms can also be applied to feature extraction for classification. Suppose a set of basis matrices $\{u_i v_i^T\}_{i=1}^r$ has been from the training data $\{A_k\}_{k=1}^K$ using the GP, EGP or OGP. In the training stage, the class label information of the training data is not used. Thus, the GP belongs to unsupervised learning.

The tested matrix Z is deemed to have the similar low-rank structure as the training matrices $\{A_k\}_{k=1}^K$. The original matrices are not handled any more but the following reconstructions may be used instead $$\hat{A}_k = \sum_{i=1}^r s_{k,i} u_i v_i^T, \hat{Z} = \sum_{i=1}^r s_{z,i} u_i v_i^T \quad (44)$$

where $\{s_{z,i}\}$ is the solution of $\min \|\Sigma_{i=1}^r s_i^z u_i v_i^T - Z\|_F^2$. Similar to (33), this solution is expressed as $$s_r = G_r^{-1} B_r^T z \quad (45)$$

where $s_z = [s_{z,1}, \ldots, s_{z,r}]^T$ collects the r coefficients, z=vec(Z), $B_r$ has the same form as (32) with i=r, and $G_r = B_r B_r^T$ is the Gram matrix of the basis matrices. The distance between $\hat{Z}$ and $\hat{A}_k$ is taken as the similarity measure after rank reduction, which is computed as $$\|\hat{Z} - \hat{A}_k\|_F^2 = \|vec(\hat{Z} - \hat{A}_k)\|^2 = \quad (46)$$
$$\|B_r(s_z - s_k)\|^2 = (s_z - s_k)^T G_r (s_z - s_k) = \left\|G_r^{\frac{1}{2}}(s_z - s_k)\right\|^2$$

where $$G_r^{\frac{1}{2}} \in \mathbb{R}^{r \times r}$$

is the square root matrix of $G_r$. Thus, $$G_r^{\frac{1}{2}} s_z \in \mathbb{R}^r$$

can be viewed as the "feature vector" of Z extracted by the greedy algorithm. Since $s_k = G_r^{-1} B_r^T a_k$ for the OGP, (46) is further simplified to $$\|\hat{Z} - \hat{A}_k\|_F^2 = (d_z - d_k)^T G_r^{-1} (d_z - d_k) \quad (47)$$

where $$d_z = B_r^T z = [u_1^T Z v_1, \ldots, u_r^T Z v_r]^T. \quad (48)$$

The $d_k$ has similar expression as $d_z$. Noting that the OGP already outputs $G_r^{-1}$, only $d_z$ and $d_k$ need to calculate. The feature vector of Z extracted by the OGP can also be expressed as $$G_r^{-\frac{1}{2}} d_z.$$

In the test stage, the nearest neighbor (NN) classifier is employed. The tested sample is assigned to the class of its closest neighbor that has the minimum distance of the reconstructed matrices $\hat{Z}$ and $\hat{A}_k$. However, it is not necessary to perform reconstruction in practice. Instead, the distance can be efficiently computed according to (46) or (47), where only r-dimensional vectors are involved.

The following lemma which facilitates the convergence analysis has been proved.

Lemma 1: At the ith iteration, when applying Algorithm 2 to the rank-one approximation of matrices $\{R_k^{i-1}\}_{k=1}^K$, the objective function of the subproblem (20) at the solution $(u_i, v_i)$ is guaranteed $$\sum_{k=1}^K (u_i^T R_k^{i-1} v_i)^2 \geq \frac{1}{\min(m,n)K} \sum_{k=1}^K \|R_k^{i-1}\|_F^2. \quad (49)$$

where $(u_i, v_i)$ denotes the solution of the rank-one approximation at the ith iteration, as well as the solution or subproblem (20) given by Algorithm 2. As Algorithm 2 adopts the manner of alternating maximization, it non-decreases the objective function and indicates that the objective function at $(u_i, v_i)$ is no less than that at the initial value $(u^0, v^0)$ and therefore $$\sum_{k=1}^K (u_i^T R_k^{i-1} v_i)^2 \geq \sum_{k=1}^K ((u^0)^T R_k^{i-1} v^0)^2 \quad (50)$$
$$\geq \max_{1 \leq k \leq K} ((u^0)^T R_k^{i-1} v^0)^2$$
$$= ((u^0)^T R_{k_m}^{i-1} v^0)^2 = \sigma_{max}^2(R_{k_m}^{i-1})$$
$$\geq \frac{1}{K} \sum_{k=1}^K \sigma_{max}^2(R_k^{i-1})$$
$$\geq \frac{1}{K} \sum_{k=1}^K \frac{1}{\text{rank}(R_k^{i-1})} \sum_{l=1}^{\text{rank}(R_k^{i-1})} \sigma_l^2(R_k^{i-1})$$
$$= \frac{1}{K} \sum_{k=1}^K \frac{1}{\text{rank}(R_k^{i-1})} \|R_k^{i-1}\|_F^2$$
$$\geq \frac{1}{\min(m,n)K} \sum_{k=1}^K \|R_k^{i-1}\|_F^2$$

where the equation in the third line exploits that the initial values $u^0$ and $v^0$ are the principal singular vectors of $R_{k_m}^{i-1}$ and the inequality at the fourth line follows from that $R_{k_m}^{i-1}$ has the maximum spectral norm, i.e., $$\sigma_{max}^2(R_{k_m}^{i-1}) = \max_k \sigma_{max}^2(R_k^{i-1}).$$

Also, the equation in the sixth line is based on the fact the square of the Frobenius norm of a matrix equals the sum of the squared singular values and the last inequality is due to $\text{rank}(R_k^{i-1}) \leq \min(m,n)$.

The following guarantees the convergence of the GP for LRAMM and gives a lower bound on the convergence rate.

The reconstruction error, i.e., the energy of the residual matrices of the GP for LRAMM in Algorithm 1 decays exponentially:

$$\sum_{k=1}^K \|R_k^i\|_F^2 \leq \gamma_{GP}^i \sum_{k=1}^K \|A_k\|_F^2 \quad (51)$$

for the iteration number i=0, 1, 2, . . . , where $$\gamma_{GP} = 1 - \frac{1}{\min(m,n)K} \quad (52)$$

satisfying $0 < \gamma_{GP} < 1$ is a lower bound of the convergence rate. Note that in the optimization literature, exponential convergence also refers to geometric convergence or linear convergence.

Starting with the residual update formula in (13), it follows that $$\sum_{k=1}^{K} \|R_k^i\|_F^2 = \sum_{k=1}^{K} \|R_k^{i-1} - s_{k,i} u_i v_i^T\|_F^2 \quad (53)$$

$$= \min_{\|u\|=\|v\|=1, s} \sum_{k=1}^{K} \|s_k u v^T - R_k^{i-1}\|_F^2$$

$$= \min_{\|u\|=\|v\|=1} \left\{ \sum_{k=1}^{K} \|R_k^{i-1}\|_F^2 - \sum_{k=1}^{K} (u^T R_k^{i-1} v)^2 \right\}$$

$$= \sum_{k=1}^{K} \|R_k^{i-1}\|_F^2 - \min_{\|u\|=\|v\|=1} \sum_{k=1}^{K} (u^T R_k^{i-1} v)^2$$

$$= \sum_{k=1}^{K} \|R_k^{i-1}\|_F^2 - \sum_{k=1}^{K} (u_i^T R_k^{i-1} v_i)^2$$

$$\leq \sum_{k=1}^{K} \|R_k^{i-1}\|_F^2 - \frac{1}{\min(m,n)K} \sum_{k=1}^{K} \|R_k^{i-1}\|_F^2$$

$$= \left(1 - \frac{1}{\min(m,n)K}\right) \sum_{k=1}^{K} \|R_k^{i-1}\|_F^2$$

$$= \gamma_{GP} \sum_{k=1}^{K} \|R_k^{i-1}\|_F^2$$

where the equations in the second and fifth lines follow from (12), i.e., $(u_i, v_i, s^i)$ is the minimizer of the rank-one approximation or equivalently is the maximizer of (20) at the ith iteration. Meanwhile, the third equation is a reduced result of the second line with s being eliminated, which follows from (19). The inequality in (53) is due to Lemma 1. Successively applying the above relation, the following relation may be obtained:

$$\sum_{k=1}^{K} \|R_k^i\|_F^2 \leq \gamma_{GP}^i \sum_{k=1}^{K} \|R_k^0\|_F^2 = \gamma_{GP}^i \sum_{k=1}^{K} \|A_k\|_F^2 \quad (54)$$

where $R_k^0 = A_k$ for k=1, . . . , K may be used. Since the decay ratio satisfies $0 < \gamma_{GP} < 1$, the reconstruction error strictly decreases at each iteration and the GP algorithm converges with a worst decay rate of $\gamma_{GP}$.

It is apparent that the reconstruction error approaches zero:

$$\lim_{i \to \infty} \sum_{k=1}^{K} \|R_k^i\|_F^2 = 0 \quad (55)$$

due to $\gamma_{GP} \in (0, 1)$. This implies that the stopping criterion in (14) is well defined for any $\delta > 0$. Obviously, (55) also indicates $$\lim_{i \to \infty} \|R_k^i\|_F^2 = 0, \text{ and } \lim_{i \to \infty} R_k^i = 0, k = 1, \ldots, K. \quad (56)$$

As discussed above, the following corollary allows an infinite series expansion for an arbitrary set of matrices $\{A_k\}_{k=1}^K$.

For any matrix set $\{A_k\}_{k=1}^K$, the GP algorithm leads to an infinite series expansion, which is shown as $$A_k = \sum_{i=1}^{\infty} s_{k,i} u_i v_i^T, k = 1, \ldots, K \quad (57)$$

where $(u_i, v_i, s^i)$ is the result obtained by Algorithm 1 at the ith iteration.

Successive application of the residual update formula of (13) results in $$R_k^i = R_k^{i-1} - s_{k,i} u_i v_i^T \quad (58)$$

$$= R_k^0 - \sum_{l=1}^{i} s_{k,l} u_l v_l^T$$

$$= A_k - \sum_{l=1}^{i} s_{k,l} u_l v_l^T$$

or $$A_k - \sum_{l=1}^{i} s_{k,l} u_l v_l^T + R_k^i. \quad (59)$$

Exploiting $$\lim_{i \to \infty} R_k^i = 0$$

in (56) and taking limits as $i \to \infty$ on both sides of (59) yields (57).

Preferably, the EGP has the same convergence result. To prove the convergence of the EGP, it is necessary to replace "≥" by "=" in the first line of (50), while other steps remain unchanged as the GP. It should be pointed out that the GP and EGP merely have the worst-case lower bounds of the convergence rates. Their practical convergence rates are generally different. The worst case refers to that there is no improvement using the iterative procedure in Algorithm 2 compared with merely using the initial value of (25). This case happens when $v^u$ is in the intersection of the null spaces of $\{R_k^{i-1}\}_{k \neq k_m}$, resulting in $R_k^{-1} v^0 = 0$ for $k \neq k_m$.

However, if $\{R_k^{i-1}\}_k$ have similar low-rank structure, the principal singular vector of one matrix lies in all null spaces of other matrices does not happen. That is, the iterative procedure in Algorithm 2 will improve the rank-one solution, which makes the GP generally converge faster than the EGP.

It is clear that the convergence of the OGP is guaranteed since its reconstruction error decreases faster than that of the GP due to the re-minimization with respect to the weight coefficients of (28) at each iteration. This means that the convergence rate of the OGP is faster than the GP. Theorem 2 further states how much the OGP is faster than the GP, where the acceleration factor is quantitatively given.

The reconstruction error of the OGP for LRAMM in Algorithm 4 decays exponentially $$\sum_{k=1}^{K} \|R_k^i\|_F^2 \leq \gamma_{OGP}^{j-1} \gamma_{GP} \sum_{k=1}^{K} \|A_k\|_F^2 \quad (60)$$

for the iteration number i=0, 1, 2, . . . , where a lower bound of the convergence rate $$\gamma_{OGP} = 1 - \frac{\rho}{\min(m,n)K} \quad (61)$$

satisfies $0<\gamma_{OGP}<1$ with $\rho>1$ being the acceleration factor. Also, it follows that $\gamma_{OGP}<\gamma_{GP}$ due to $\rho>1$ and hence the OGP converges faster than the GP.

The following lemma is also proved.

Lemma 2: The squared Frobenius norms of $R_k^i$ and $R_k^{i-1}$ for $i=1, 2, \ldots$, are linked by $$\|R_k^i\|_F^2 = \|R_k^{i-1}\|_F^2 - \rho_i(u_i^T R_k^{i-1} v_i)^2 \quad (62)$$

where $\rho_1=1$ and for $i \geq 2$ $$\rho_i = \frac{1}{\sin^2\theta_i} > 1 \quad (63)$$

with $\theta_i$ being the angle between $\text{vec}(u_i v_i^T)$ and the subspace spanned by $\{\text{vec}(u_l v_l^T)\}_{l=1}^{i-1}$.

At the first iteration or $i=1$, the OGP obtains the same result as the GP. By (18), $\rho_1=1$ is determined. The case of $i \geq 2$ is then considered. Denoting $r_k^i = \text{vec}(R_k^i)$ and $r_k^{i-1} = \text{vec}(R_k^{i-1})$, $\|R_k^i\|_F^2 = \|r_k^i\|^2$ and $\|R_k^{i-1}\|_F^2 = \|r_k^{i-1}\|^2$ are obtained. The relation between $\|r_k^i\|^2$ and $\|r_k^{i-1}\|^2$ may be further derived. Recalling $r_k^i = B_i s^i - a_k$, (33) it follows that $$r_k^i = (\Pi_i - I)a_k = -\Pi_i^\perp a_k \quad (64)$$

where $$\Pi_i B_i (B_i^T B_i)^{-1} B_i^T \in \mathbb{R}^{mn \times mn} \quad (65)$$

is the orthogonal projection matrix onto range($B_i$), i.e., the column space of $B_i$, while $$\Pi_i^\perp = i - \Pi_i \quad (66)$$

is the projection matrix onto the complementary subspace of range($D_i$), i.e., range($B_i^\perp$).

Then, $$\|r_k^i\|^2 = \|\Pi_i^\perp a_k\|^2 = a_k^T (\Pi_i^\perp)^T \Pi_i^\perp a_k a_k^T \Pi_i^\perp a_k \quad (67)$$

where the projection matrix is symmetric and idempotent, i.e., $\Pi_i^\perp = (\Pi_i^\perp)^T = (\Pi_i^\perp)^2$. Similarly, $\|r_k^{i-1}\|^2 = a_k^T \Pi_{i-1}^\perp a_k$ where $$\Pi_{i-1} = B_{i-1}(B_{i-1}^T B_{i-1})^{-1} B_{i-1}^T. \quad (68)$$

Plugging $B_i = [B_{i-1}, b_i]$ into (65) and using the block matrix inversion formula with tedious but straightforward derivations, $$\prod_i = \prod_{i-1} + \rho_i \prod_{i-1}^\perp b_i b_i^T \prod_{i-1}^\perp \text{ and} \quad (69)$$

$$\prod_i^\perp = \prod_{i-1}^\perp - \rho_i \prod_{i-1}^\perp b_i b_i^T \prod_{i-1}^\perp \text{ where} \quad (70)$$

$$\rho_i = \frac{1}{b_i^T \prod_{i-1}^\perp b_i}. \quad (71)$$

To prove $\rho_i>1$, denoting the projection onto a convex set C as $\Pi_c(\cdot)$. The non-expansiveness states that $\|\Pi_c(b)\| \leq \|b\|$ is true for any vector b. Since range($B_{i-1}$) is a subspace and also a convex set, the projections $\Pi_{i-1}$ and $\Pi_{i-1}^\perp$ are non-expansive. This elicits $$b_i^T \Pi_{i-1}^\perp b_i = \|\Pi_{i-1}^\perp b_i\|^2 \leq \|b_i\|^2 = 1 \quad (72)$$

where $\|b_i\|^2=1$ is due to (38). Only when $b_i$ is orthogonal to range($B_i$) or $\langle b_i, b_l \rangle = 0$ for all $l=1, \ldots, i-1$, $\|\Pi_{i-1}^\perp b_i\|^2 = \|b_i\|^2$ happens and $\rho_i=1$ in this case. Since $$\langle b_i, b_l \rangle = \langle u_i v_i^T, u_l v_l^T \rangle = \langle u_i, u_l \rangle \langle v_i, v_l \rangle, \quad (73)$$

$\langle b_i, b_l \rangle = 0$ implies $\langle u_i, v_l \rangle = 0$ or $\langle v_i, v_l \rangle = 0$ for all $l=1, \ldots, i-1$. However, unlike the orthogonal requirement in the GLRAM, orthogonalization is not performed to the columns of U or V. For random matrices or matrices containing random components, the probability of $\langle v_i, v_l \rangle = 0$ or $\langle v_i, v_l \rangle = 0$ is zero. Hence, $\|\theta_{i-1}^\perp b_i\|^2 < \|b_i\|^2$ and $\rho_i > 1$ are determined in general. The cosine of the angle between $b_i$ and the subspace range($B_{i-1}^\perp$) is $$\cos\phi_i = \frac{\langle b_i, \prod_{i-1}^\perp b_i \rangle}{\|b_i\| \|\prod_{i-1}^\perp b_i\|} = \|\prod_{i-1}^\perp b_i\| = \frac{1}{\sqrt{\rho_i}} \quad (74)$$

where $\langle b_i, \Pi_{i-1}^\perp b_i \rangle = b_i^T \Pi_{i-1}^\perp b_i = \|\Pi_{i-1}^\perp b_i\|^2$ and $\|b_i\|=1$ are used. Hence, $$\rho_i = \frac{1}{\cos^2\phi_i} = \frac{1}{\sin^2\theta_i} \quad (75)$$

where $\theta_i$ is the angle between $b_i$ and the subspace range $(B_{i-1})$ and $\theta_i + \phi = \pi/2$ because range($B_{i-1}^\perp$)) is the orthogonal compliment of range($B_{i-1}$)

It follows from (70) that $$a_k^T \Pi_i^\perp a_k = a_k^T \Pi_{i-1}^\perp a_k - \rho_i a_k^T \Pi_{i-1}^\perp b_i b_i^T \Pi_{i-1}^\perp a_k. \quad (76)$$

Substituting (64) and (67) into (76) yields $$\|r_k^i\|^2 = \|r_k^{i-1}\|^2 - \rho_i (b_i^T r_k^{i-1})^2. \quad (77)$$

Since $$b_i^T r_k^{i-1} = \langle b_i, r_k^{i-1} \rangle = \langle u_i v_i^T, R_k^{i-1} \rangle \quad (78)$$
$$= tr(v_i u_i^T R_k^{i-1}) = u_i^T R_k^{i-1} v_i$$

(77) in the vector form is equivalent to the matrix form of (62), which completes the proof.

Summing (62) in Lemma 2 from $k=1$ to K and using Lemma 1 leads to $$\sum_{k=1}^{K} \|R_k^i\|_F^2 = \sum_{k=1}^{K} \|R_k^{i-1}\|_F^2 - \rho_i \sum_{k=1}^{K} (u_i^T R_k^{i-1} v_i)^2 \leq \quad (79)$$
$$\sum_{k=1}^{K} \|R_k^{i-1}\|_F^2 - \frac{\rho_i}{\min(m,n)K} \sum_{k=1}^{K} \|R_k^{i-1}\|_F^2$$
$$= \left(1 - \frac{\rho_i}{\min(m,n)K}\right) \sum_{k=1}^{K} \|R_k^{i-1}\|_F^2$$

which holds true for $i, i-1, \ldots, 2$. Successively applying (79) results in $$\sum_{k=1}^{K} \|R_k^i\|_F^2 \leq \prod_{l=2}^{i} \left(1 - \frac{\rho_l}{\min(m,n)K}\right) \sum_{k=1}^{K} \|R_k^1\|_F^2 \leq \quad (80)$$

-continued $$\left(1 - \frac{\rho}{\min(m, n)K}\right)^{i-1} \sum_{k=1}^{K} \|R_k^1\|_F^2 = \gamma_{OGP}^{i-1} \sum_{k=1}^{K} \|R_k^1\|_F^2$$

where $\rho = \min\{\rho_2, \ldots, \rho_i\}$ and $\rho > 1$. For i=1, the OGP is the same as the GP and thus the reconstruction error obeys $$\sum_{k=1}^{K} \|R_k^1\|_F^2 \leq \gamma_{GP} \sum_{k=1}^{K} \|A_k\|_F^2. \quad (81)$$

Combining (80) and (81) yields (60).

From the second iteration (i≥2), the OGP converges faster than the GP because of $\gamma_{OGP} < \gamma_{GP}$. The acceleration ratio depends on $\rho$. The larger the value of $\rho$, the faster the OGP is. Furthermore, the OGP has finite convergence property, as stated in the following theorem.

The current residual matrices $\{R_k^i\}_{k=1}^{K}$ generated by the OGP are orthogonal to all rank-one matrices $\{u_l v_l^T\}_{l=1}^{i}$ that have been chosen. These selected rank-one matrices are linearly independent with each other. The reconstruction error of the OGP will be zero after at most mn iterations.

Two matrices A and B are orthogonal if their inner product $\langle A, B \rangle = 0$, or equivalently, $\langle \text{vec}(A), \text{vec}(B) \rangle = 0$. According to (64), it follows that $$B_i^T r_k^i = -B_i^T \Pi_i^\perp a_k = 0, k=1, \ldots, K \quad (82)$$

where $B_i^T \Pi_i^\perp = 0$ is used, which is obviously true because $\Pi_i^\perp$ is the projection onto the orthogonal complement of range($B_i$). Then, (82) amounts to $\langle b_l, r_k^i \rangle = 0$ or $\langle u_l v_l^T, R_k^i \rangle = 0$, for l=1, ..., i. This completes the proof of $\{R_k^i\}_{k=1}^{K}$ being orthogonal to $\{u_l v_l^T\}_{l=1}^{i}$. To prove that $\{u_l v_l^T\}$ are linearly independent with each other, it is only necessary to show the rank-one matrix obtained in the next iteration is linearly independent of all rank-one matrices in the previous iterations. $u_{i+1} v_{i+1}$ is linearly independent of $\{u_l v_l^T\}_{l=1}^{i}$ by contradiction. Suppose that $u_{i+1} v_{i+1}^T$ is linearly dependent of $\{u_l v_l^T\}_{l=1}^{i}$. Then, it can be represented by the linear combination of $\{u_l v_l^T\}_{l=1}^{i}$, i.e., $u_{i+1} v_{i+1}^T = \sum_{l=1}^{i} \alpha_l u_l v_l^T$ with $\alpha_l \in \mathbb{R}$. The inner product $$\langle u_{i+1} v_{i+1}^T, R_k^i \rangle = \sum_{l=1}^{i} \alpha_l \langle u_l v_l^T, R_k^i \rangle = 0 \quad (83)$$

implies $u_{i+1}^T R_k^i v_{i+1} = 0$ for k=1, ..., K as well as $\sum_{k=1}^{K} (u_{i+1}^T R_k^i v_{i+1})^2 = 0$. According to (20), the GP and OGP select $(u_{i+1}, v_{i+1})$ such that $$(u_{i+1}, v_{i+1}) = \arg \max_{\|u\|=\|v\|=1} \sum_{k=1}^{K} (u^T R_k^i v)^2. \quad (84)$$

But $\sum_{k=1}^{K} (u_{i+1}^T R_k^i v_{i+1})^2 = 0$ attains the minimum due to the assumption that $u_{i+1} v_{i+1}^T$ is linearly dependent of $\{u_l v_l^T\}_{l=1}^{i}$. This case only happens when all residual matrices $\{R_k^i\}_{k=1}^{K}$ vanish and the reconstruction error becomes zero. In this case, the algorithm has already converged and terminated. Otherwise, it contradicts.

$\{u_l v_l^T\}$, or $\{b_l = \text{vec}(u_l v_l^T)\}_l$ are linearly independent with each other provided that any residual matrix does not vanish. After i=mn iterations, $B_i$ contains mn linearly independent columns which span the whole space of $\mathbb{R}^{mn}$. Then, the residual $r_k^i = -\Pi_i^\perp a_k = 0$ due to $\Pi_i^\perp = 0$, which also implies $R_k^i = 0$ and $\sum_{k=1}^{K} \|R_k^i\|_F^2 = 0$ after at most mn iterations.

In many practical applications, mn is usually very large. Generally, a target rank r<<m, is enough to capture the low-rank structure and achieves a small reconstruction error.

The inventors performed experiments to evaluate the performances and advantages of the method for processing electronic data in accordance with embodiments of the present invention. In the experiments, the simulation and experiments were conducted using a computer with a 2.2 GHz CPU and 4 GB memory. In addition to synthetic random data, the following three example databases, including two face datasets, and one object dataset, are used in the experiments.

In a first experiment performed, the ORL face database was processed and analysed. The database consists of 10 different images for each of 40 distinct subjects, and thus there are a total of 400 images. The resolution of the gray-scale images is 112×92, indicating that m=92, n=112, and K=400.

In a second experiment performed, the Georgia Tech face database was processed and analysed. The database contains 750 images of 50 individuals. There are 15 images for each individual. As the original images are colored and with different sizes, the images were converted to gray-scale with the same dimensions of 111×156, corresponding to m=150, n=111, and K=750.

In a third experiment performed, the MNIST database of handwritten digits was processed and analysed. The database is composed of images of digits 0 to 9 written by 500 different people. There are 70000 images with dimensions of 28×28 in total while a smaller subset of 2000 samples were selected, which results in m=n=28 and K=2000.

In a fourth experiment, the COIL-20 database was processed and analysed. The database includes 1440 gray-scale images of 20 different objects, which corresponds to 72 images per object. The image resolution is 128×128 and it follows m=n=128 and K=1440.

The convergence behaviors are investigated using synthesized random data. The parameters are set as m=100, n=120, and K=15. A set of noise-free matrices of rank 10 is generated by $A_k = U S_k V^T$, k=1, ..., K, where the entries of $U \in \mathbb{R}^{m \times 10}$ and $V \in \mathbb{R}^{10 \times n}$ satisfy the standard Gaussian distribution while the diagonal entries of $S_k$ are uniformly distributed in [1,2] to avoid any diagonal entry being too close to zero.

Figure 2:
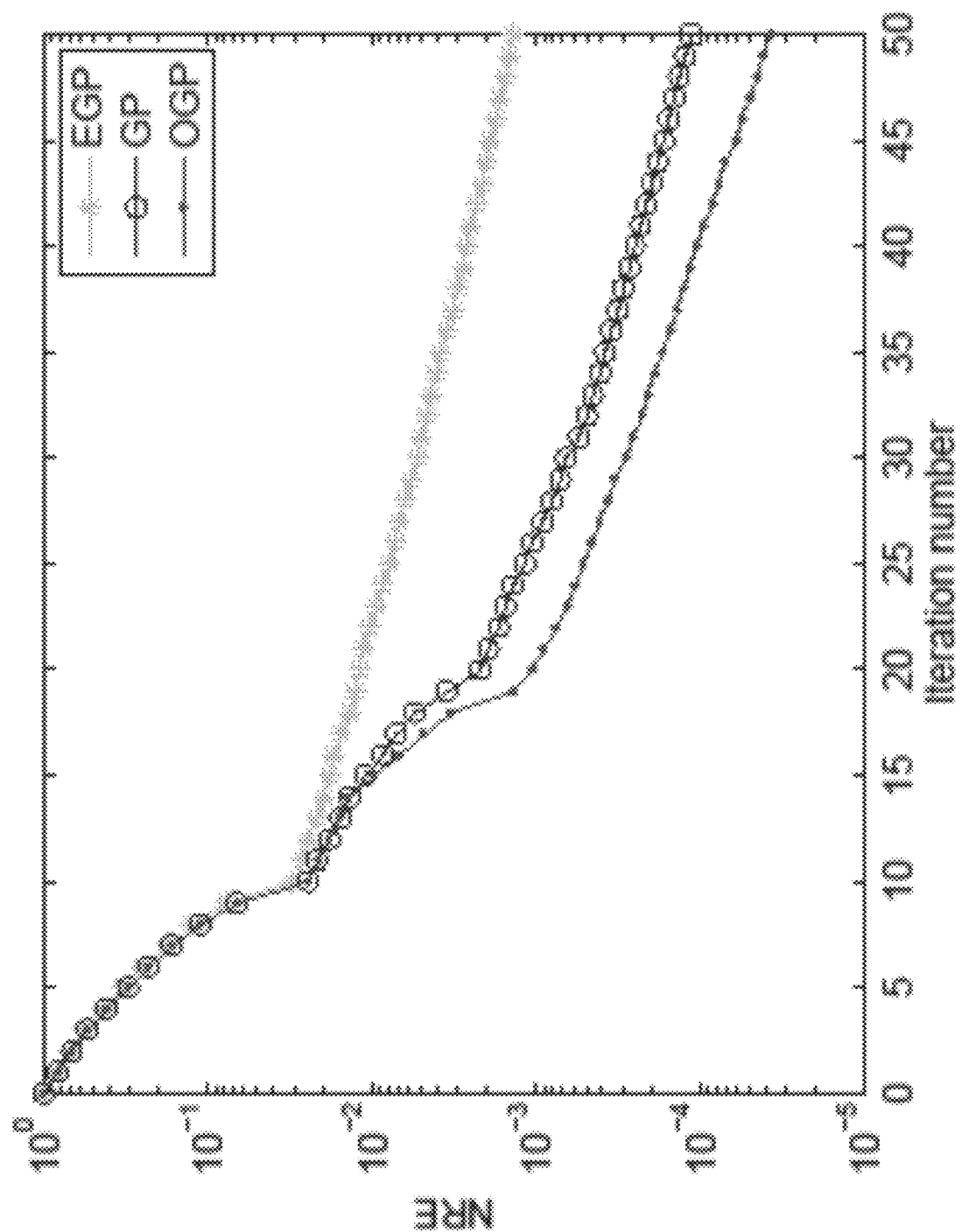
FIG. 2 is a plot showing normalized reconstruction error (NRE) versus iteration number using random data in noise-free case involved in the method used in accordance with one embodiment of the present invention.

With reference to FIG. 2, there is shown a plot showing the NRE of (14) versus iteration number for noise-free case. It may be observed that the reconstruction error rapidly decreases when the iteration number is not larger than the rank. The reconstruction error approaches zero as the iteration proceeds. The OGP converges fastest while the EGP converges slowest, although all of them have linear convergence rates. Then, the noise matrices $N_k$ whose entries are independent and identically distributed Gaussian with variance $\sigma_n^2$ are added to $A_k$. The signal-to-noise ratio (SNR) is defined as SNR=$(\sum_{k=1}^{K} \|A_k\|_F^2)/(mnK\sigma_n^2)$. In the presence of noise, the oracle bound of the NRE is dominated by the noise level.

Figure 3:
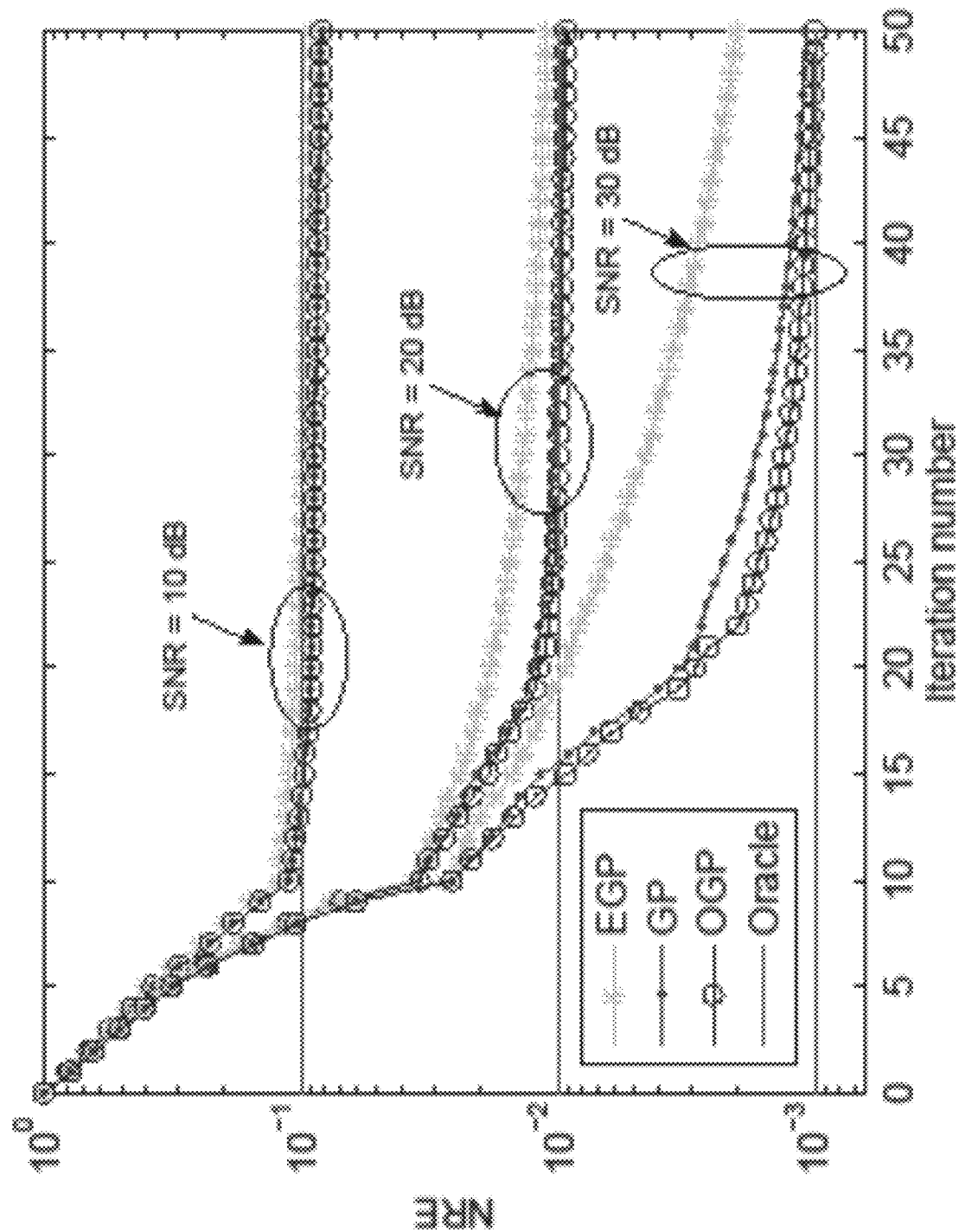
FIG. 3 is a plot showing NRE versus iteration number using random data in Gaussian noise at SNRs of 10, 20, and 30 dB involved in the method used in accordance with one embodiment of the present invention.

With reference to FIG. 3, it is shown that the NRE as well as the oracle bound versus iteration number at SNRs of 10, 20, and 30 dB. The oracle bounds equal the reciprocal of the SNRs. It may be observed that the reconstruction error rapidly decreases when i≤10. After approaching the oracle bounds, the NREs decrease slowly. This means that the greedy methods have captured the dominating low-rank structure and the iterative procedure can be stopped since little improvement is attained due to the impact of the noise.

Figure 4:
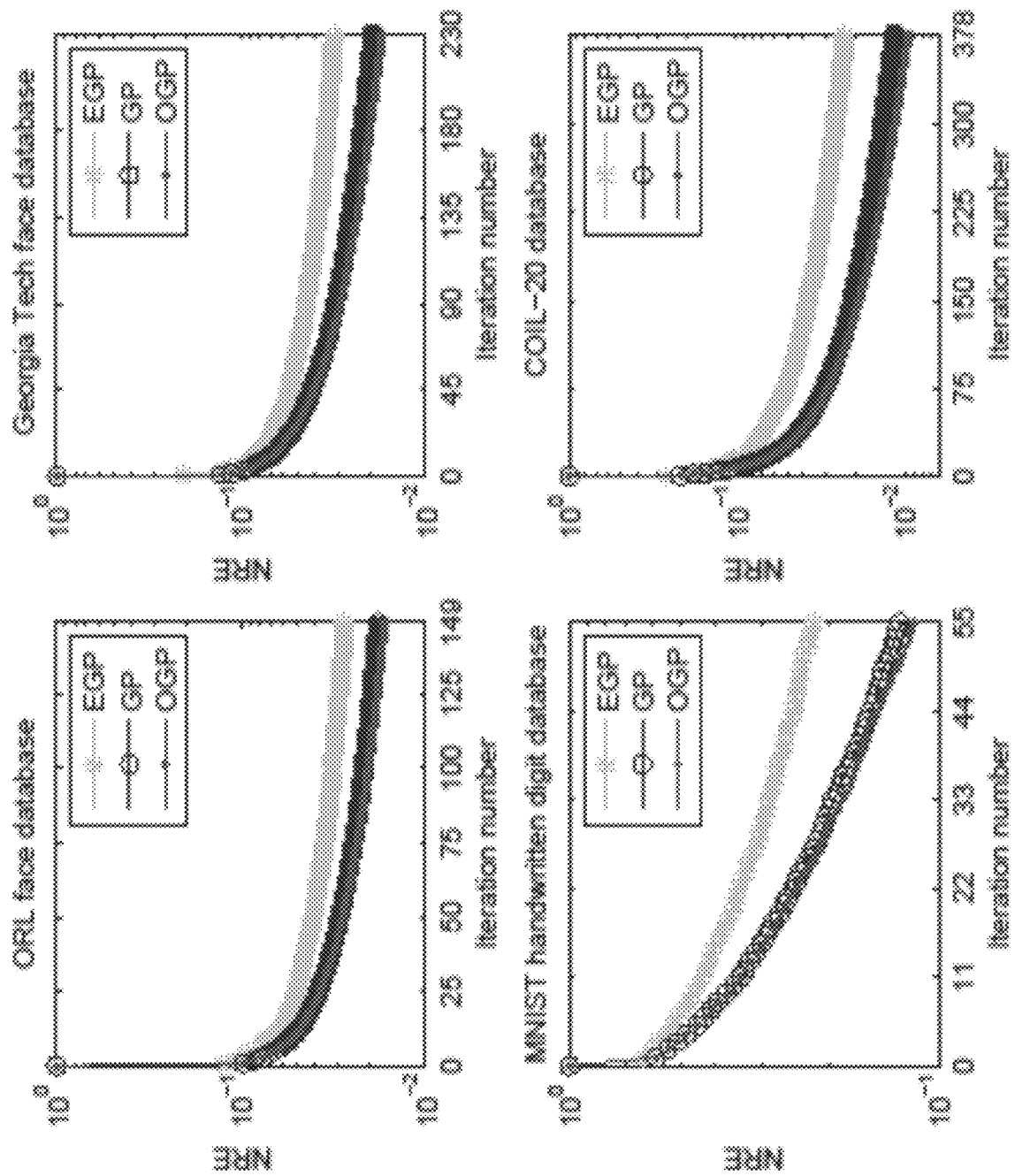
FIG. 4 are plots showing NRE versus iteration number for ORL face, Georgia Tech face, MNIST handwritten digit, and COIL-20 databases.

With reference to FIG. 4, it is shown that the NRE versus iteration number on the four example image databases. It is observed that the three greedy algorithms significantly decrease the reconstruction error at the beginning stage. This implies that these real-world images exhibit several "principal components" and the proposed methods successfully find these components although the data are not strictly of low-rank. The maximum iteration numbers r are set to 149, 231, 53, and 378 for the ORL face, Georgia Tech face, MNIST, and COIL-20 databases, respectively. To achieve a sufficiently small reconstruction error, the maximum iteration number r needs to be larger than min(m,n) but r<<mn. Again, the OGP has the fastest convergence rate while the EGP is the slowest.

In accordance with an embodiment of the present invention, the system for processing electronic data may be used for processing digital image data. In this embodiment, the method for processing digital image data comprises the steps of: transforming the digital image data to a matrix representation including a plurality of matrices; decomposing the matrix representation into a series of matrix approximations; processing, with an approximation process, the plurality of matrices thereby obtaining a low-rank approximation of the plurality of matrices; and constructing at least one digital image based on the low-rank approximation of the plurality of matrices.

The digital image data may represent at least two source images with noise and/or defect.

In another experiment performed by the inventors, the performances of an image reconstruction process of the GP/EGP/OGP method in accordance with the present invention are compared with the PCA, 2DPCA, and GLARM methods in the presence of outliers.

For fair comparison, the NREs of the six methods are computed under the same (or close) compression ratios. According to Table 1, $r_1$, $r_2$, $r_3$, and $r_4$, which denote the target ranks of PCA, 2DPCA, GLARM, and GP/EGP/OGP, respectively, should satisfy $$(mn + K + 1)r_1 = (mK + n)r_2 = (m + n + Kr_3)r_3 = (m + n + K)r_4 \quad (85)$$

to achieve comparable compression ratios in the six methods. Noting that $r_1, \ldots, r_4$ are positive integers, (85) may not be strictly satisfied. The positive integers may be selected such that the compression ratios are as close as possible.

With reference to FIGS. 5 to 8, there is shown representative examples of the reconstructed images obtained by the six algorithms on the ORL face, Georgia Tech face, MNIST, and COIL-20 databases, respectively. The corresponding samples of the original images are also included for comparison. Obviously, the three greedy algorithms have much smaller reconstruction error than the PCA and 2DPCA under similar compression ratios. In other words, the greedy methods can achieve higher compression ratio under the same reconstruction error. This is because the reconstruction error monotonically increases with the compression ratio. In general, the GP, OGP and GLRAM have comparable performance. Note that for the COIL-20 database, the NRE of the OGP, $9.70\times10^{-3}$, is moderately smaller than that of the GLRAM, $1.22\times1.0^{-2}$, while their compression ratios are nearly the same.

Figure 5:
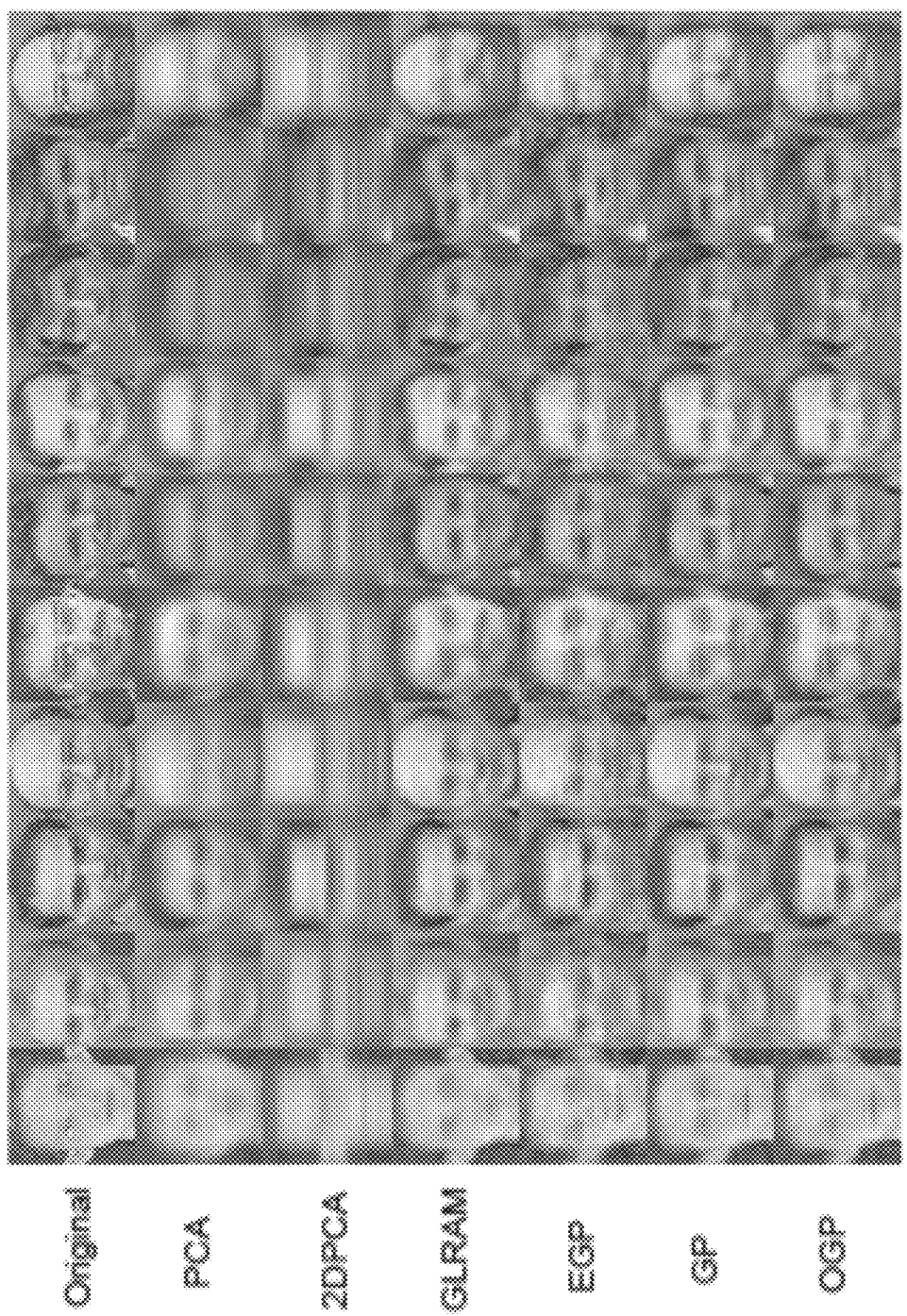
FIG. 5 is a combined image showing samples of original, noisy, and reconstructed images for ORL face database.

With reference to FIG. 5, the compression ratios of the PCA, 2DPCA, GLARM, and EGP/GP/OGP are 48.1, 45.9, 44.3, and 45.8 corresponding to the ranks of 8, 2, 15, and 149. The NREs of the above six methods are $4.56\times10^{-2}$, $5.02\times10^{-2}$, $1.63\times10^{-2}$, $2.75\times10^{-2}$, $1.82\times10^{-2}$, and $1.66\times10^{-2}$, respectively.

Figure 6:
FIG. 6 is a combined image showing samples of original, noisy, and reconstructed images on Georgia Tech face database.

With reference to FIG. 6, the compression ratios of the PCA, 2DPCA, GLARM, and EGP/GP/OGP are 55.3, 55.4, 58.7, and 55.5 corresponding to the ranks of 13, 2, 17, and 230. The NREs of the above six methods are $5.51\times10^{-2}$, $6.69\times10^{-2}$, $1.82\times10^{-2}$, $3.15\times10^{-2}$, $1.94\times10^{-2}$, and $1.72\times10^{-2}$, respectively. A compression ratio of 55.5 implies that only 1.8% storage space of the original data is needed after compression.

Figure 7:
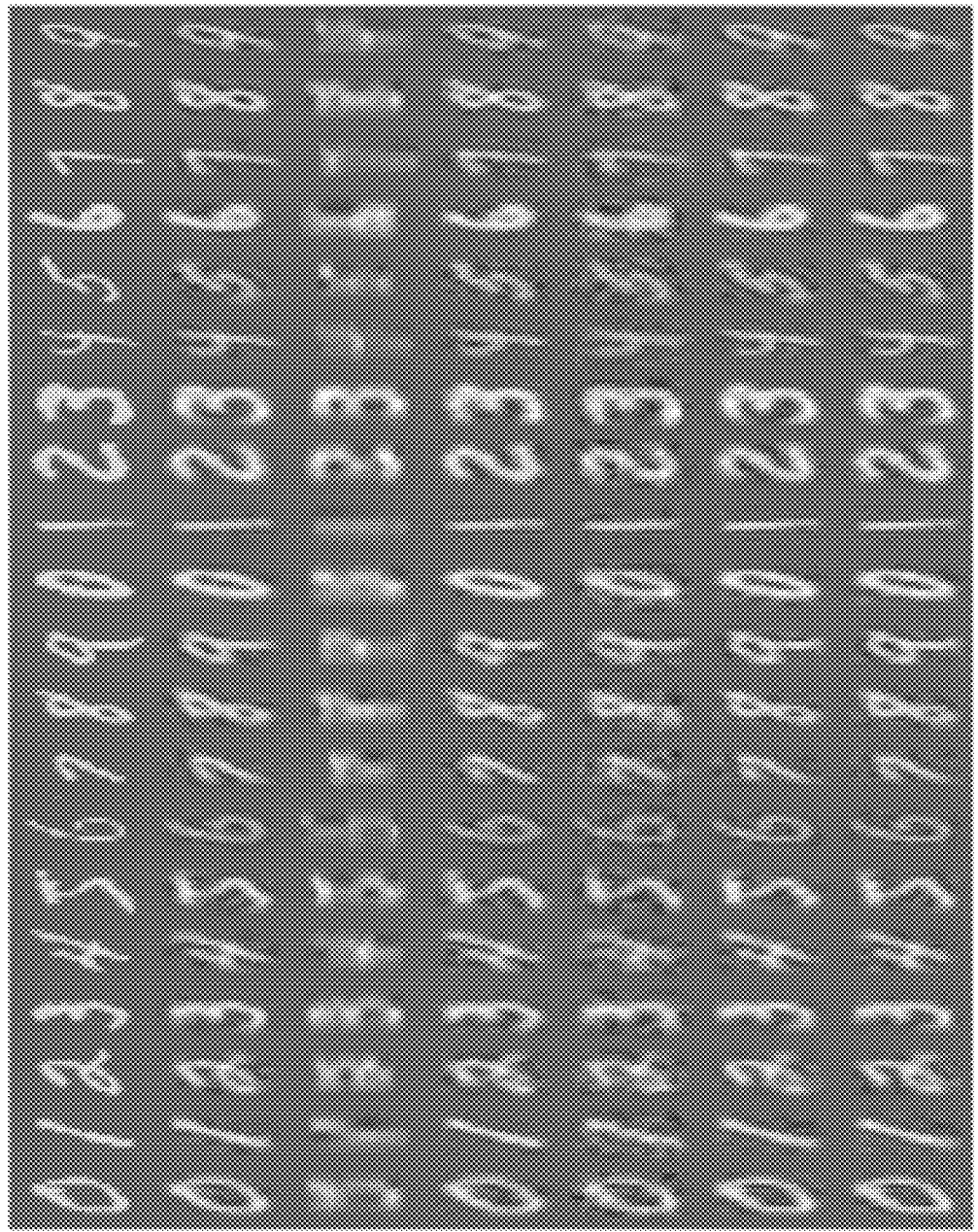
FIG. 7 is a combined image showing samples of original, noisy, and reconstructed images on MNIST database of handwritten digits.

With reference to FIG. 7, the compression ratios of the PCA, 2DPCA, GLARM, and EGP/GP/OGP are 14.1, 14.0, 15.9, and 13.9 corresponding to the ranks of 40, 2, 7 and 55. The NREs of the above six methods are 0.129, 0.363, 0.15, 0.218, 0.128, and 0.117, respectively.

Figure 8:
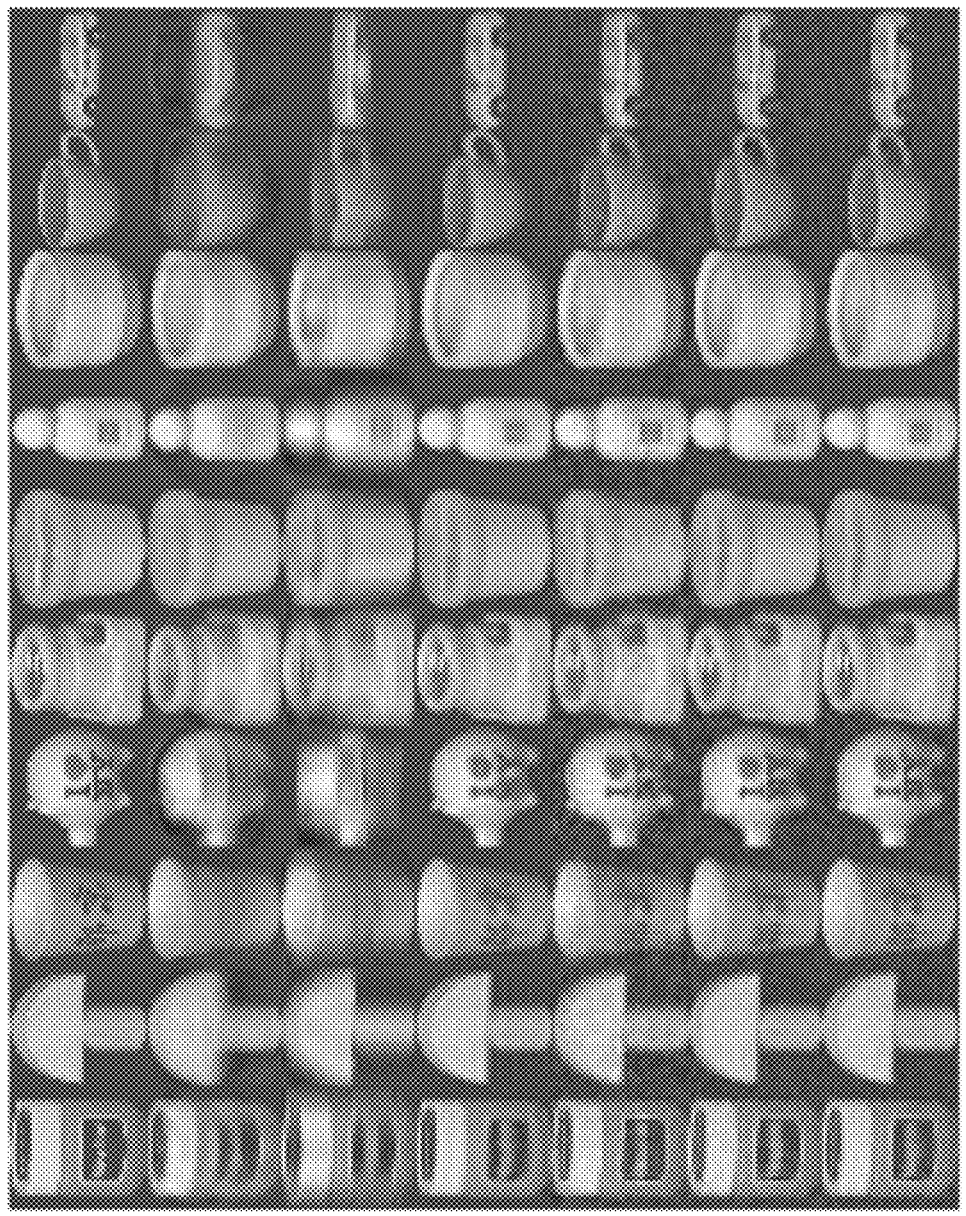
FIG. 8 is a combined image showing samples of original, noisy, and reconstructed images for COIL-20 database of object.

With reference to FIG. 8, the compression ratios of the PCA, 2DPCA, GLARM, and EGP/GP/OCP are 31.3, 32.0, 33.3, and 32.0 corresponding to the ranks of 22, 4, 22, and 378. The NREs of the above six methods are $3.45\times10^{-2}$, $4.63\times10^{-2}$, $1.22\times10^{-2}$, $2.29\times10^{-2}$, $1.17\times10^{-2}$, and $9.70\times10^{-3}$, respectively.

Figure 9:
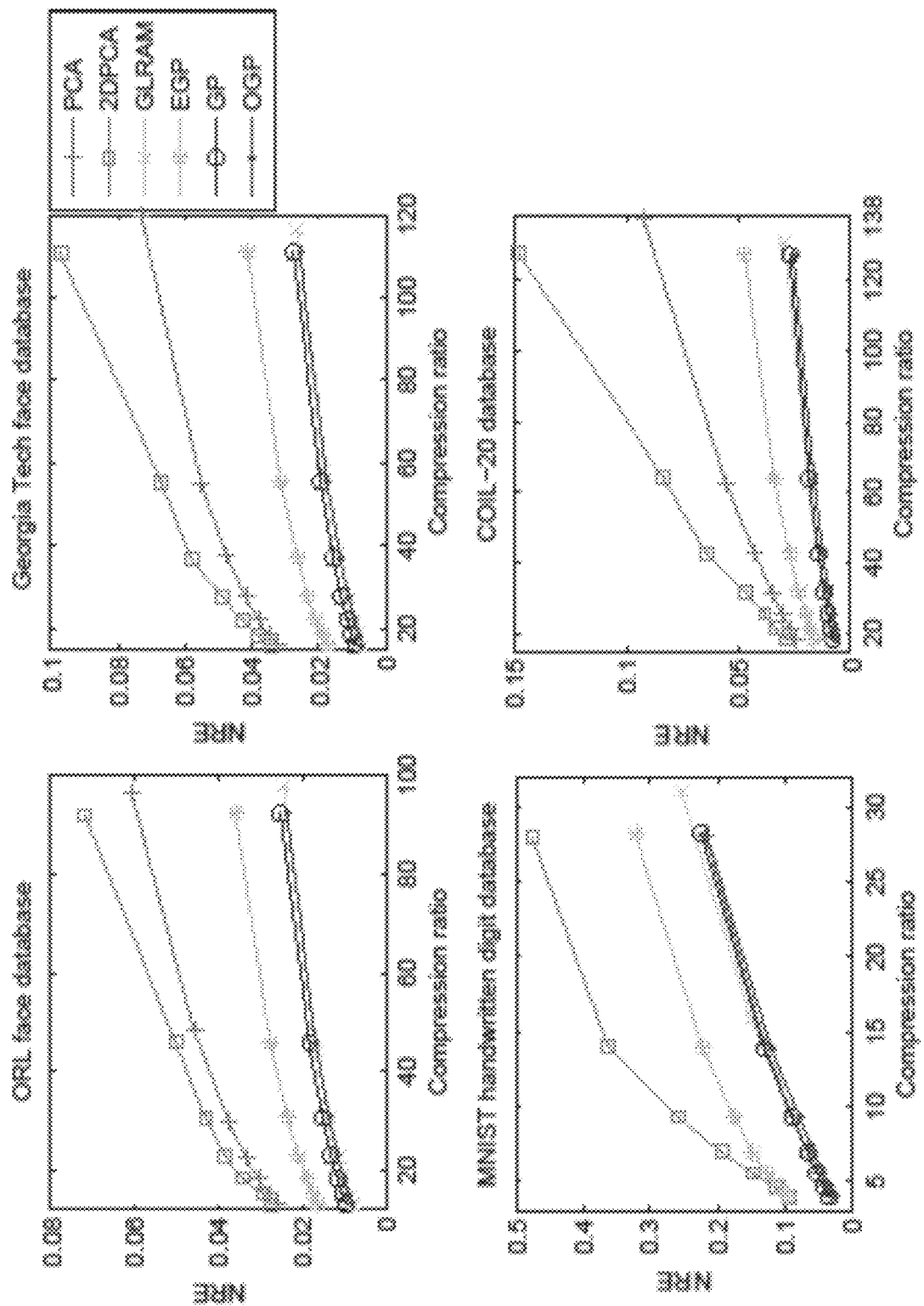
FIG. 9 are plots showing NREs of PCA, RPCA, 2DPCA, GLARM, EGP, GP and OGP method versus compression ratio for four example databases.

The inventors also investigated how the reconstruction error varies with the compression ratio. With reference to FIG. 9, there is shown a plot of the NREs of the six methods versus compression ratio for the four image databases. The reconstruction errors of all GP/EGP/OGP methods monotonically increase with the compression ratio. The OGP has the best reconstruction performance for all databases. The GP and GLRAM have similar performance as the OGP. Despite the low computational cost of the 2DPCA, its performance is not satisfactory because it only uses a single-sided transform, resulting in limited compression capability. Note that for the MNIST database, the performance of the PCA is good and comparable to the GLRAM, GP, and OGP, where mn=788 is less than K=2000. For other three databases where m>>K, the performance of the PCA has a large gap compared with the GLRAM and greedy methods. Therefore, for high-dimensional data with very large mn, the advantage of 2D based methods over the vectorization based methods is more evident.

Figure 10:
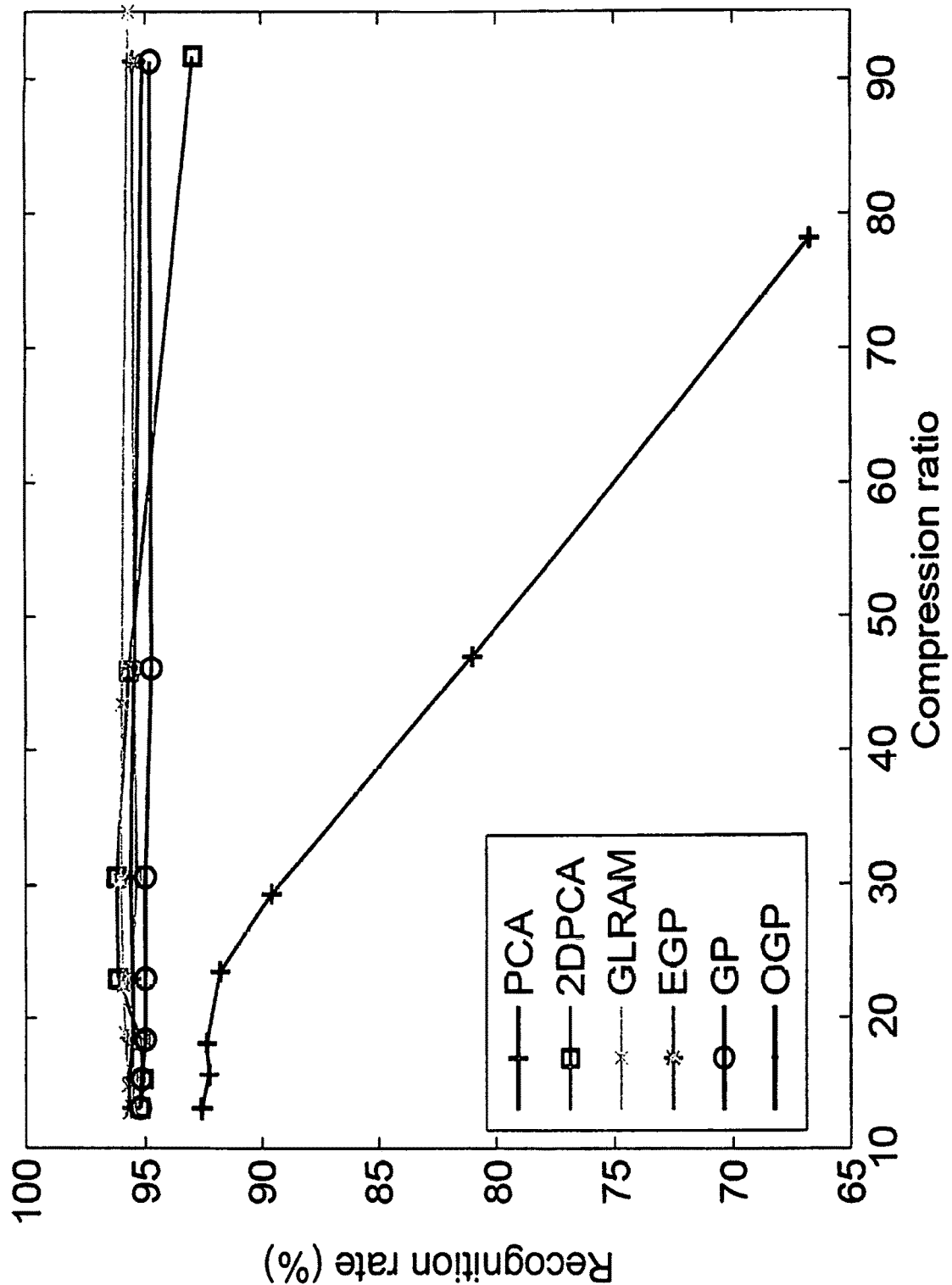
FIG. 10 is a plot showing recognition rate versus compression ratio for ORL face database.

With reference to FIG. 10, there is shown a plot of the recognition rate versus compression ratio on the ORL face database. In this experiment, 60% samples of each class are randomly selected as training samples while the remaining 40% are used as test samples. The six methods learn the low-rank structure using the training set and then the NN classifier is employed to the test samples. It may be observed that the performance of the PCA is the worst for classification. The performances of the other five methods are similar for small compression ratios. For large compression ratios, the 2DPCA becomes slightly worse. It is also seen that the recognition performance is not so sensitive to the compression ratio or reduced dimension.

These embodiments may be advantageous in that a matrix approximation method including three variants, namely, GP, EGP and OGP is provided, for learning the common low-rank structure of multiple matrices, which is an extension of the single matrix case. Unlike the existing non-diagonal decompositions, the method realizes a non-orthogonal but joint diagonal decomposition of multiple matrices, which allows a more parsimonious representation and a higher compression ratio.

Advantageously, the GP works in an iterative manner. At each iteration, it finds a rank-one approximation of the residuals. For GP and OGP, an alternating optimization method is devised for the rank-one fitting problem while for the EGP, just an approximate solution is employed to reduce the complexity. To accelerate the convergence, the OGP re-computes the weights of the basis matrices, where least squares orthogonalization is recursively solved.

It has been proven that the reconstruction error of each of the GP, EGP and OGP decays exponentially. The lower bound of the convergence rate or decay factor of the GP and EGP is derived. In addition, the finite convergence of the OGP is proved. In addition, it is shown that OGP converges faster than the GP. The acceleration factor of the OGP over GP/EGP is dominated by the angle between the current iterate and the subspace spanned by the previous iterates.

All of the GP/EGP/OGP methods are scalable to the problem size and computationally more efficient than the celebrated PCA since the method directly deals with the 2D matrices. When compared with other 2D based approaches such as 2DPCA and GLRAM, the GP, EGP and OGP achieve a joint diagonal decomposition for multiple matrices, and hence have a higher compression ratio given the same target rank. In other words, the greedy algorithms achieve smaller reconstruction errors under the same compression ratio.

Furthermore, the experimental results demonstrate the superiority of the GP methods over the PCA, 2DPCA and GLRAM, in terms of computational simplicity, convergence speed and reconstruction accuracy.

It will also be appreciated that where the methods and systems of the present invention are either wholly implemented by computing system or partly implemented by computing systems then any appropriate computing system architecture may be utilised. This will include stand alone computers, network computers and dedicated hardware devices. When the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for processing digital image data, comprising the steps of:
   transforming the digital image data to a matrix representation including a plurality of matrices;
   decomposing the matrix representation into a series of matrix approximations;
   processing, with an approximation process, the plurality of matrices thereby obtaining a low-rank approximation of the plurality of matrices; and
   constructing at least one digital image based on the low-rank approximation of the plurality of matrices, wherein the approximation process includes:
   a greedy pursuit approximation process, and
   a linear regression process, and further includes:
   determining a best rank-one approximation of a plurality of residual matrices in each of a plurality of iteration steps in the approximation process; and
   subtracting a plurality of rank-one basis matrices from the plurality of residual matrices.

2. The method for processing digital image data in accordance with claim 1, wherein the digital image data are digitally compressed data.

3. The method for processing digital image data in accordance with claim 1, wherein the digital image data represent at least one source image with noise and/or defect.

4. The method for processing digital image data in accordance with claim 1, further comprising the step of processing the digital image data using a feature extraction process for classification of the digital image data.

5. The method for processing digital image data in accordance with claim 1, further comprising the step of representing a solution associated with the matrix representation and the K residual matrices as $(u_i, v_i, s^i)$ and $\{R_k^i\}_{k=1}^{K}$, respectively at the ith iteration step.

6. The method for processing digital image data in accordance with claim 5, wherein in the ith iteration step, the rank-one approximation of $\{R_k^{i-1}\}_{k=1}^{K}$ is determined.

7. The method for processing digital image data in accordance with claim 6, further comprising the step of determining coefficients $\{s_{k,l}\}$ of the matrix representation $(u_i, v_i, s^i)$ at the ith iteration.

8. The method for processing digital image data in accordance with claim 7, wherein the coefficients $\{s_{k,l}\}$ are determined by a least squares method.

9. The method for processing digital image data in accordance with claim 8, wherein the coefficients $\{s_{k,l}\}$ are determined after obtaining $\{u_l\}_{l=1}^{i}$ and $\{v_l\}_{l=1}^{i}$ at the ith iteration.

10. The method for processing digital image data in accordance with claim 7, wherein the approximation process includes an orthogonal greedy pursuit approximation process.

11. A method for processing digital image data, comprising the steps of:
   transforming the digital image data to a matrix representation including a plurality of matrices;
   decomposing the matrix representation into a series of matrix approximations;
   processing, with an approximation process, the plurality of matrices thereby obtaining a low-rank approximation of the plurality of matrices; and
   constructing at least one digital image based on the low-rank approximation of the plurality of matrices;
   wherein the approximation process includes a greedy pursuit approximation process;
   wherein the approximation process includes a linear regression process;
   wherein the approximation process further includes a rank-one fitting process for obtaining the low-rank approximation of the plurality of matrices; and
   wherein the low-rank approximation of the plurality of matrices are determined to be a principal singular value of each of the plurality of matrices having a maximum spectral norm.

12. The method for processing digital image data in accordance with claim 11, wherein the approximation process includes an economic greedy pursuit approximation process.

13. The method for processing digital image data in accordance with claim 11, wherein the digital image data are digitally compressed data.

14. The method for processing digital image data in accordance with claim 11, wherein the digital image data represent at least one source image with noise and/or defect.

15. The method for processing digital image data in accordance with claim 11, further comprising the step of processing the digital image data using a feature extraction process for classification of the digital image data.

16. A method for processing digital image data, comprising the steps of:
- transforming the digital image data to a matrix representation including a plurality of matrices;
- decomposing the matrix representation into a series of matrix approximations;
- processing, with an approximation process, the plurality of matrices thereby obtaining a low-rank approximation of the plurality of matrices; and constructing at least one digital image based on the low-rank approximation of the plurality of matrices;

wherein the step of decomposing the matrix representation into a series of matrix approximations includes a non-orthogonal decomposition of the plurality of matrices.

17. The method for processing digital image data in accordance with claim 16, wherein the non-orthogonal decomposition includes a joint diagonal decomposition.

18. The method for processing digital image data in accordance with claim 16, wherein the digital image data are digitally compressed data.

19. The method for processing digital image data in accordance with claim 16, wherein the digital image data represent at least one source image with noise and/or defect.

20. The method for processing digital image data in accordance with claim 16, further comprising the step of processing the digital image data using a feature extraction process for classification of the digital image data.

* * * * *